United States Patent [19]
Biller et al.

[11] Patent Number: 5,824,373
[45] Date of Patent: Oct. 20, 1998

[54] RADIATION CURING OF POWDER COATINGS ON WOOD

[75] Inventors: Kevin M. Biller, Columbus; Ben A. Mac Fadden, Circleville, both of Ohio

[73] Assignee: Herbert's Powder Coatings, Inc., Hilliard, Ohio

[21] Appl. No.: 611,970

[22] Filed: Mar. 6, 1996

Related U.S. Application Data

[63] Continuation of Ser. No. 369,471, Jan. 6, 1995, abandoned, which is a continuation-in-part of Ser. No. 230,232, Apr. 20, 1994, abandoned.

[51] Int. Cl.$^6$ .............................. B05D 1/04; B05D 7/24; C08J 7/18; C08F 4/00
[52] U.S. Cl. .......................... 427/474; 427/485; 427/514; 427/517; 427/519; 427/520
[58] Field of Search ..................... 427/461, 474, 427/485, 195, 487, 500, 506, 514, 517, 519, 520

[56] References Cited

U.S. PATENT DOCUMENTS

| | | | |
|---|---|---|---|
| 3,974,303 | 8/1976 | Iwase et al. | 427/485 |
| 4,113,898 | 9/1978 | Gardziella et al. | 427/195 |
| 4,122,225 | 10/1978 | Holmstrom et al. | 427/508 |
| 4,131,690 | 12/1978 | Jukes et al. | 427/32 |
| 4,190,686 | 2/1980 | Muis | 427/317 |
| 4,390,565 | 6/1983 | Fonda | 427/504 |
| 4,460,632 | 7/1984 | Adur | 428/35 |
| 4,477,532 | 10/1984 | Schmukler et al. | 428/441 |
| 4,481,262 | 11/1984 | Shida et al. | 428/441 |
| 4,530,778 | 7/1985 | Nelson et al. | 427/485 |
| 4,537,836 | 8/1985 | Adur et al. | 428/522 |
| 4,749,728 | 6/1988 | Craun et al. | 523/400 |
| 4,957,841 | 9/1990 | Macholdt et al. | 430/110 |
| 5,021,470 | 6/1991 | Macholdt et al. | 523/451 |
| 5,068,305 | 11/1991 | Meixner et al. | 528/49 |
| 5,124,107 | 6/1992 | Schmid | 264/255 |
| 5,207,829 | 5/1993 | Schwab et al. | 106/493 |
| 5,300,331 | 4/1994 | Schaeffer | 427/493 |
| 5,369,140 | 11/1994 | Valet et al. | 522/75 |
| 5,409,740 | 4/1995 | Brann | 427/513 |

FOREIGN PATENT DOCUMENTS 326204  1/1972  Russian Federation ............... 427/485

OTHER PUBLICATIONS

1974 "Wood Engineering Handbook" by U.S. Forest Products Laboratory, Prentice–Hall, pp. 3–21 to 3–23. No month.
Radtech Europe Conference, 1993: "Radiation Curing of Powder Coating–a Possibility for Powder Coating to Enter New Application Areas" by M. Wittig and T. Gehmann, pp. 533–544. No month.
Teknologisk: Sprint Programme Manual: Ed. Peter Svane, Aug. 1993.
S.P. Pappas, ed. *UV Curing: Science and Technology;* Tech. Marketing Corp., Conneticut. 1978 (No Month) pp. 104–110.
Savage, D., "Powder Coating: A Look at Equipment and Materials," Products Finishing (Jan. 1972) pp. 40–51.
Hackh's Chemical Dictionary, 4th ed., McGraw Hill (1969 No Month) p. 15.
The Condensed Chemical Dictionary, 10th ed., Van Nostrand Reinhold (1981 No Month) p. 17.

*Primary Examiner*—Marianne Padgett
*Attorney, Agent, or Firm*—Porter, Wright, Morris & Arthur

[57] ABSTRACT

Powder coatings are described which are curable by means of exposure to radiation, typically ultraviolet radiation, and the electrostatic deposition thereof onto substrates of wood or similar materials. Free radical curing coatings are described using specific chemical formulations of acryloure-thane resins, unsaturated polyester resins and mixtures thereof in combination with morpholino, phenol, phosphine and ketal photoinitiators. Electrostatic application onto wooden substrates involves grounding of the substrate, electrostatic deposition and, typically, heating the substrate to flow the coating into a smooth finish prior to radiation curing. Moisture and humidity controls may also be used to improve the electrostatic coating process.

23 Claims, 2 Drawing Sheets

RADIATION CURING OF POWDER COATINGS ON WOOD

This application is a continuation of application Ser. No. 08/369,471, filed Jan. 6, 1995 now abandoned.

FIELD OF THE INVENTION

The present invention relates to powder coatings curable by means of exposure to radiation, typically ultraviolet radiation. In particular, the present invention relates to formulations and methods of use for powder coatings cured by ultraviolet radiation in which free radical curing chemical mechanisms are present, in combination with ultraviolet photoinitiation or photocatalysis, pigmented additives, and the electrostatic application of such coatings to wood and wood-related products.

BACKGROUND OF THE INVENTION

Increasing use is being found in industrial applications for photopolymerizable coatings. By "photopolymerizable coating" we mean a coating placed upon a substrate in which the curing step to form the final coating firmly affixed to the substrate is initiated by exposure of the coating to some form of radiation. In typical applications, exposure to ultraviolet ("uv") radiation is the preferred means of curing. Typical uv radiation is sufficiently energetic to be a useful initiator of certain chemical reactions when a suitable photoinitiating chemical species is present. One of the advantages of using uv radiation is that, for typical wavelengths used for photocurable coatings, these wavelengths are not commonly present as a significant component of background ambient radiation to which the coating may be exposed during handling or storage incidental to the coating process, or during subsequent use of the coated article (tending to cause discoloration or hazing of the coating). Among the disadvantages of uv radiation as a curing agent is the relative expense and safety considerations in the production and use of uv. Therefore, as an alternative to uv curable coatings, certain visible wavelengths may also provide initiation of photopolymerization when used in conjunction with the appropriate light-absorbing chemical species. Visible light as a photoinitiator suffers from the disadvantages noted above related to accidental or incidental exposure, but also suffers from the disadvantage of being much less energetic, photon for photon, than uv. This requires the use of different chemistry, typically related to dyes or other molecules possessing relatively large regions of conjugated unsaturations for purposes of lowering the typical absorption energies of the molecule from the uv to visible spectral regions.

In addition, electromagnetic radiation more energetic than uv (such as x-ray) may provide initiation of photopolymerization. Also, exposure to electron beams may be used as the means to initiate polymerization of the coating and, hence, cure. One of the advantages of using electron beams is the fact that the incident electron is typically sufficiently energetic to initiate the reaction directly without the intervention of special photoinitiating species. The oligomers of the coating to be cured directly interact with the incident electron beam to form the species necessary to react further without the need for photoinitiators to be added to the mixture. However, typically such process must be carried out in a vacuum as the electron beam does not significantly penetrate air, thus adding to the complexity of such processes for industrial production applications. Electron beam equipment is typically very costly compared to other forms of photoinitiating sources of radiation.

We distinguish herein "radiation curing" from "thermal curing". By "radiation curing" we intend to mean the interaction of a molecule with electromagnetic or other radiation (commonly electron beams) in which a specific molecular energy state, or set of states, are caused to be excited, resulting in curing of the resin. The excitation of molecular energy states by such radiation results in a population of molecular energy levels different from the normal Boltzmann population distribution expected from the application of heat in "thermal curing". Confusion may occur when considering the various methods in which heat may be applied to a coating to effect thermal cure. Ovens or infra-red lamps are the typical sources of heat for thermal cures. Both of these energy sources are not typically suited for effecting radiation curing as defined herein. Thus, thermal curing is the obvious mechanism intended. However, some researchers (Holliday, UK patent 2,056,885) use uv radiation as a source of heat, not excitation radiation for specific energy levels. In this case, care must be taken to note the specific chemical reactions following the exposure to uv radiation. If such reactions are typical of thermal curing, then uv radiation is used for a source of heat, not level-specific molecular excitations. Herein we use "thermal curing" to mean curing by means of heat and Boltzmann distributions of molecular energy levels, even if that heat may be supplied by means of exposure to uv radiation.

For the purposes of the present invention we will use the term "ultraviolet" or "uv" to denote radiation which is used to initiate photopolymerization other than by thermal means; that is "radiation curing". We specifically exclude from this definition use of uv as a source of heat (see Holliday) with the understanding that not all exposures to uv radiation effect "radiation curing". The invention described herein is not intended to be limited thereby to exclude exposure to other forms of radiation, such as electron beams or radiation more or less energetic than uv (typically x-rays or visible radiation respectively), which in specific instances initiate photopolymerization (as distinguished from thermal curing), unless specifically stated in conjunction with the particular compounds or chemistry under consideration. Since ultraviolet is expected to be the preferred radiation for the practice of the chemistry of the present invention, we will use the term "uv" for economy of language.

There are several reasons for the increasing interest in uv curable coatings. Typically, uv curable coatings are applied to the substrate to be coated without significant amounts of solvent present in the formulation. Commonly, uv curable coatings applied in the liquid form are delivered in a mixture of monomers, which polymerize rather than evaporate in the subsequent uv cure. Therefore, the curing step involves polymerization of the coating without significant drying. Hence, insignificant (or greatly reduced) amounts of emissions into the air are present when uv curable coatings are used. Environmental concerns for exposure of the workers engaged in the coating process, as well as the general population concerned with improving air quality, are thereby served. While reducing solvent emissions into the air is an advantage of liquid uv curable coatings, the powder uv curable coatings described herein typically reduce emissions even further.

Typical uv curable coatings employ less energy than thermal cures and typically require significantly less cure time. Reduction of the energy required for the curing of the coating clearly is advantageous in reducing process costs. Reduction of curing time reduces the quantity of work-in-progress for a given rate of production. This results in savings in terms of the costs associated with the product flowing through the coating process. Reduced curing time also allows the coating industry to respond more rapidly to customer preferences and specific orders, much in keeping with the modern trend to "just in time" manufacturing.

Additionally, less factory floor space is typically required for uv curing systems than is commonly the case for other means of curing, leading to cost reduction by lowering the investment required in building space and the expenses of building maintenance, utilities, etc.

It is commonly the case for uv curable coatings that additional coatings may be applied immediately following the uv cure. Such immediate recoatability is not typically the case for most conventional coating and curing processes.

A significant advantage of uv curable coatings (in contrast to thermally cured coatings) lies in the avoidance of heating of the substrate to elevated temperatures in order to effect cure. The present invention was motivated in part by the need to coat wood, wood-related products, or other heat-sensitive substrates. UV curable coatings offer a very substantial advantage in requiring much less input of heat and, therefore, much lower surface temperatures, allowing such heat-sensitive substrates to be coated and cured without heat-induced damage.

The general field of photochemistry, and the particular field of photoinitiated polymerization, is a large and active one with an extensive literature and significant continuing research. In contrast to the present invention, virtually none of this prior research involves the use of solid reactants for coatings. In order to fix terminology, we review here some of the basic concepts of photopolymerization.

The initial step in photopolymerization reactions is the transfer of energy from the incident radiation (electromagnetic or otherwise) to the chemical system to be photopolymerized. There are two general categories of interaction mechanism by which this may occur.

In one instance, the incident radiation is absorbed by an absorbing molecule within the chemical system, but the absorbing molecule is not itself consumed in subsequent chemical reactions. In this case, the absorbing molecule is generally termed a "photosensitizer" since it acts as a photocatalyst; promoting chemical reactions without itself being consumed. The incident radiation in this case results in the excitation of internal energy states of the photosensitizer. Typically, the internal excitations will involve electronic excitations of low lying electronic states of the photosensitizer, but other modes of internal excitation are also possible (such as vibrational, rotational or combinations of electronic with vibrational and rotational modes). The excited photosensitizer then undergoes intermolecular energy transfer, transferring its internal energy thereby to another molecule which is the initiator of the polymerization reaction. By means of this intermolecular energy transfer, the photosensitizer is returned to its original state (typically the ground state), ready for further excitation by incident radiation.

However, strict photocatalysis (in which all of the photoabsorber is regenerated for additional uv absorption) has some disadvantages when used for the curing of coatings on surfaces. Typically, except for very thin coatings, the incident curing radiation will not penetrate effectively throughout the entire thickness of the coating, leading to faster or more complete curing on the surface than in lower layers. It is, therefore, useful for the photoinitiator to become slowly ineffective at absorbing radiation, permitting greater penetration of the curing radiation through the upper levels of the coating to reach (and cure) the lower levels. Such "photobleaching" must occur at a rate slow enough to permit complete curing of the upper surface before the photoinitiating species is destroyed, but rapid enough to allow curing of lower layers in reasonable times. Such photobleaching chemicals and mixtures are the subject of active research primarily directed to the field of liquid photopolymerization systems, and are likely to become increasingly useful for thicker coatings in which penetration to lower levels is more difficult.

Another general category of initiation mechanism for photopolymerization reactions is the case in which the radiation is absorbed by the molecule which begins the first step of the polymerization reaction. That is, the radiation absorber is consumed in the reaction as the chain initiator for subsequent polymerization. This is generally referred to as "photoinitiator". Typically, the photoinitiator will be excited, fragmented or ionized by means of its interaction with the incident radiation. The resulting species initiate polymerization and are consumed by the reaction. Thus, radiation must be absorbed by a supply of photoinitiators, continuing until the photoinitiators are consumed.

Photocatalysis (via a photosensitizer) and photoinitiation (as defined herein) are very different conceptual chemical processes: one leading to consumption of the radiation-absorbing species, one not. However, the actual terminology as commonly used in the field is not so precise. "Photoinitiator" is generally used to mean any species which interacts with the incident radiation, whether consumed in the reaction or not. Thus, common usage has photosensitizer as a subclass of the class of photoinitiators. The present invention does not critically distinguish between the use of photosensitizers and the use of (noncatalytic) photoinitiators. Therefore, we will adopt the common usage herein and use "photoinitiator" to encompass both catalytic photosensitizers and consumable photoinitiators. Specific distinctions will be made where necessary.

Our prior description is directed at the most common case of photoinitiation. That is, incident radiation is absorbed by a molecule leading to excitation and intermolecular energy transfer (in the case of photosensitizers), or excitation, fragmentation or ionization followed by initiation of polymerization (in the case of non-catalytic photoinitiators). However, other mechanisms are possible. The absorbing species need not be a separate or distinct molecule, but may be a specific functional group contained as a portion of a distinct molecule residing in such a chemical environment that the functional group may be treated as a nearly-distinct species for purposes of interaction with incident radiation. Also, the specific functional group may itself interact with the incident radiation, or it may alter the characteristics of its host molecule leading to absorption of radiation directly by the host (which itself is thereby the photoinitiator). For purposes of the present invention, we treat as "photoinitiation" any such mechanism of interaction with incident radiation.

In the above discussion we referred to "absorption" of the incident radiation. While this is perhaps the predominant mechanism in use for photopolymerization, the incident radiation need not be fully absorbed by the photoinitiating species. It is merely necessary that the incident radiation transfer energy to the photoinitiating molecule and thereby initiate subsequent polymerization. The incident radiation may be fully absorbed in the process of transferring energy, or it may simply be scattered by the photoinitiator, leaving some energy behind ("inelastic" or "Raman scattering"). Absorption is probably the most common mechanism when uv or other electromagnetic radiation is used for photopolymerization (although inelastic scattering is not ruled out). However, when electron or other particle beams are used to initiate photopolymerization, inelastic scattering tends to predominate over absorption. That is, the incident beam of electrons is more likely to initiate photopolymerization by means of electromagnetic energy transfer as the charged electron flies by the photoinitiating molecule, rather than becoming absorbed to create a negative ion. However, electron capture to form a negative ion is not ruled out in all cases. In discussions of the present invention, we will loosely use "absorption of radiation", "photoinitiation" and like terms to denote any, all, or any combination of photoinitiation mechanisms such as described herein or known in the field.

For purposes of discussion of the present invention, we will be primarily concerned with free radical curing systems. That is generally used to mean uv curable systems in which the primary photoinitiation step (and/or the polymer growth, propagation step) involves free radical chemical species. Free radical curing uv systems are perhaps the most commonly used in industrial applications at the present time. However, those currently in use are virtually exclusively liquid coatings. The common types of such coatings presently in use are generally acrylates (typically epoxy acrylates, urethane acrylates, polyester acrylates, polyether acrylates), acrylated oils, unsaturated polyesters, vinyl/acrylics, or polyene/thiol systems.

The use of uv curable coatings may (but need not) involve two conceptually distinct polymerization reactions. The coating formulation may consist of monomers, oligomers, or a polymer which have remaining functionality which will typically be reacted (polymerized) in the curing step. After being applied to the substrate, the subsequent curing step involves polymerization of the coating to form the final cured coating on the substrate. If the coating is applied in the form of monomers, the curing, polymerization is the only polymerization reaction carried out in the process. This is most common for liquid uv curable coatings. However, it is frequently the case for liquid as well as for solid coatings that, prior to application to the substrate and subsequent curing, the coating itself has been partially polymerized. Thus, the coating applied in this form is known as "oligomer", "prepolymer" or (typically for solid, powder coatings) a "resin". The curing then causes remaining functionality to react in forming the final coating. Therefore, coating materials and formulations prior to curing may be designated as polymers along with specific functionality (i.e. "polyester acrylates"). It is understood thereby that previously polymerized materials are applied to the substrate and the remaining functionality is reacted during curing. For the solid or powder coatings which are the subject of the present invention, the coatings will almost never be applied in the form of a monomer.

The discussion thus far of polymerization and curing upon exposure to uv radiation has been primarily derived from liquid systems used for the formation of uv curable coatings. It is a primary purpose of the present invention to describe formulations of uv curable coatings suitable for application to the substrate in the form of a powder. The application of a coating in the form of a powder eliminates all use of solvents or liquid monomers, substantially eliminating emissions to the air.

Powder coating technology has found wide usage in the application of coatings to numerous articles of commerce. It has been especially important in the coating of office furnishings, household appliances, shelving, yard furnishings, garden tractors and other equipment, certain automotive parts, and numerous other products. There are several reasons for the increasing utility of powder coating. Powder coating technology typically does not use solvents which otherwise provide a health hazard for the workers exposed to such solvents throughout the working day. Solvent emissions are increasingly an air pollution concern as well. Such solvents additionally cause serious environmental problems in planning for and managing their disposal as waste following the coating process. The absence of solvents as an item of expense also leads to cost savings for most powder coating processes.

UV curable coatings applied as a liquid typically are deposited on the substrate in a solution of monomers. Monomer liquids have many of the same drawbacks as do solvents in contributing to environmental pollution and increasing hazards to the health of the workers. Therefore, the present invention is directed at the use of uv curable powder coatings, eliminating thereby both solvent and monomer emissions into the environment.

Typical powder coatings can be collected for reuse, thereby reducing the amount of waste materials. Reduction of waste reduces the cost of the process by reducing the cost of materials not effective in the production of the desired coating, as well as reducing the costs of disposing of waste in an environmentally acceptable manner.

The typical application method for powder coatings involves electrostatic deposition. The substrate (typically an electrical conductor) is connected to electrical ground. Powder coating is electrostatically charged, and thereby attracted to the substrate by electrostatic forces Electrostatic deposition is a preferred, but not the exclusive method for depositing powder coatings onto surfaces. Deposition may also be accomplished by blowing or dropping the powder onto the surface, or dipping the surface to be coated into the powder. In using such non-electrostatic coating methods, the surface to be coated is typically pre-heated to facilitate adhesion of the powder to the surface.

There are two general methods for causing the powder coating to become electrically charged; corona charging and tribocharging. The corona charging procedure produces a corona discharge in the surrounding air. The powder coating is propelled through the corona discharge region, acquiring thereby an electrostatic charge. The corona charging method typically produces more charge on the powder, thereby increasing the deposition on the substrate. However, the corona typically produces a greater mix of charged species in addition to the desired charged powder. In some applications the presence of free ions produced by the typical corona is not a serious disadvantage. However, for other applications in which uniformity of charge on the powder coating is a concern, or the presence of free ions otherwise interferes with the coating process, the corona charging method may not be the preferred technique.

The second method in common use for charging the powder coating for deposition involves tribocharging in which rubbing and frictional forces between the powder and another material causes an electrostatic charge to be created on the powder. In one common approach, the powder is passed through a long tube by rotation in a spiral configuration. The friction of the powder with the walls of the tube leads to the acquisition by the powder particle of an electrostatic charge. A typical tribocharging unit of this type would have numerous tubes collected into a spiral bundle configuration, typically at least one meter in length to insure adequate tribocharging of a sufficient fraction of powder particles. Introduction of the powder into one end of the bundle, followed by rotation causes charged powder particles to emerge from the other end. While this procedure is one method of tribocharging, other techniques involving reciprocating motion, etc, are, or soon will be, commercially available.

Tribocharging eliminates the need for high voltage coronas, thereby increasing the safety of the operator and tending to decrease processing costs. However, the key characteristic in the selection of tribocharging over corona charging is often the different deposition which may be achieved with tribocharging. It is believed that tribocharging tends to produce a more uniform charging of the powder. The lack of free ions and increased uniformity of charge causes tribocharging to yield superior coating properties for many powder coating applications. In addition, the charging of the powder coating is more easily controlled when tribocharging is employed. The length and material of the tribocharging bundle (for the typical spiral bundle tribocharging device) can be adjusted to allow for a wide range of charging characteristics of the powder to be applied.

Similar ease of processes control may be envisioned for other tribocharging devices as they become available.

Once deposited on the substrate, the powder coating is cured to its final finish, typically in the prior art by means of heat, either by passage through a curing oven for the appropriate time or by irradiation by means of infra-red lamps of the required intensity and wavelength to which the workpiece is exposed for the required period of time. Occasionally (as noted above) uv or other sources of radiation may be employed as source of heat without utilizing the radiation curing potential of such energy sources.

Electrostatic deposition of typical powder coatings onto conducting substrates provides significant advantages in coating textured surfaces, or other small or hard-to-access regions of a workpiece. The electrostatic attraction of the grounded substrate in regions as yet uncoated by powder in preference to those regions having (typically insulating) powder coatings thereon, tends to attract powder to all regions of the workpiece.

Powder coatings typically involve a complex mixture of chemicals. In addition to the color-carrying pigment, a typical powder paint would have one or more resins, one or more curing agents, flow and leveling agents, degassing agents, waxes, extender pigments (fillers), and perhaps additional additives selected for particular applications and purposes. Typical powder coatings would also commonly be found to contain a charging agent to assist in the process of charging of the powder and the retention of charge for application onto the substrate to be coated.

Furthermore, agents may be added to powder coatings for the purpose of adjusting the viscosity to improve the smoothness and wetting characteristics of the applied coating. Such flow control agents are commercially available in a variety of formulations from a variety of vendors.

Agents may also be added to powder coating formulations to increase storage life by hindering thermosetting or radiation curing until deliberately undertaken in the curing of the coating. Such inhibitors may take the form of very small amounts of chemicals intended to suppress curing initiated by very small quantities of initiators accidentally induced. However, when deliberate curing is commenced, such cure-suppression agents would typically be completely overwhelmed by curing reactions and have no substantial effect on the curing process.

In addition to curing agents, typical powder coatings would also commonly be found to contain a charging agent to assist in the processing of charging of the powder and the retention of charge for application onto the substrate to be coated. The work of Macholdt et. al. (U.S. Pat. Nos. 4,957,841 and 5,021,473) are examples of the use of such charging agents. As the work of Macholdt makes clear, charging agents are often useful in both corona discharge and triboelectric charging processes.

All of the above additives are in addition to the particular resins or other agents added by the powder coating manufacturer for the purpose of providing the coating color, texture, gloss, hardness, radiation and solvent resistance, etc. which typically are used to set apart one coating from another in the market.

The application of powder coatings to wood leads to additional challenges. For simplicity of language we will use the term "wood" herein to denote conventional wood in all varieties from all varieties of trees and shrubs (as such plants may be used in the form of chips, dust or powder), as well as products derived from wood such as plywood, particle board, fiber board, medium-density-fiber-board "MDF", and other wood-related products as would be typically used in commerce in a manner similar to wood, and for which a coating would be required or desirable.

Dry wood typically is made up of cellulose, lignin, various hemicellulose compounds, as well as numerous other components in lesser amounts, with considerable variation in relative composition from one type of wood to another. However, the water content of wood is a dominant component of non-baked wood and varies widely from one species of tree (and type of wood) to another and from one part of the same tree to another. Pine wood, for example, may have moisture content as low as 30% in heartwood to over 200% in sapwood (in which the % is defined as the weight of water divided by the weight of wood following oven drying.) Perhaps the first problem which must be overcome in the development of powder coatings for wood is the problem of heating the wood. It is conventionally understood in working with wood that heating in excess of about 93 deg C. (200 deg. F.) is detrimental to the properties of the wood for further applications in furniture etc. Thus, in the application of powder coatings to wood, heat above approximately 93 deg C. is to be avoided. This imposes considerable limitations on the formulations of powder coatings for use on wood and on the possibilities for using thermosetting resins, arguing strongly in favor of uv curable powder coatings, such as those of the present invention, for application to the coating of wood.

Typical wood and wood products also contain a certain amount of volatile components. Heating to any extent, even below 93 deg C., can cause such volatile materials to escape from the wood and introduce bubbles, pits or other unacceptable imperfections into the final coated product. Thus, it is desirable (although not necessarily essential) to minimize the heating of the wood during phases of the processing in which imperfections are likely to be introduced into the final coating.

Wood typically has a textured surface or a grain. This is not necessarily true of boards or other products derived from finely divided and compacted wood. But for many applications the textured surface of naturally-occurring wood is considered desirable by the consumer and may be artificially introduced into even those wood-derived products which could easily be manufactured with a high degree of smoothness. The typical wood texture of sanded or smoothed wood may not be obvious to human touch, but must be taken into account in designing a coating formulation and process.

Even the small variations from ridges to valleys can cause coatings to miss certain areas of the surface or coat in various thicknesses, leading to unacceptable coating.

As noted above, electrostatic deposition of powder coatings onto conducting substrates provides significant advantages in coating textured surfaces since the electrostatic attraction of powder to the substrate tends to enhance coating of surface regions not as yet coated with (typically insulating) powder. Thus, in achieving a uniform powder coating of textured wood surfaces, electrostatic attraction may be expected to have certain advantages.

However, in the coating of typical woods, electrostatic attraction has not been widely employed. It is well known that dry wood (typically oven dried taken as fully dry wood) is a reasonably good electrical insulator but the resistivity can decrease by 13 or 14 orders of magnitude to lie in the range of 1,000 to 10,000 ohm-meters for wood having a moisture content at "fiber saturation". (See "Wood Engineering Handbook" by U.S. Forest Products Laboratory, 1974, pages 3-21 to 3-22.) Water can exist in wood bound chemically within cells and trapped in cavities. "Fiber saturation" is taken to mean a specimen of wood in which cells are saturated with all the water they can hold, but no water is trapped in cavities. Highly wet wood in which significant moisture is also trapped in cavities can have electrical resistivities reduced by another factor of 100 to the range of approximately 10 to 1,000 ohm-meters. However, the resistivity of wood having water trapped in cavities is highly variable from sample to sample even within the same type of wood processed in substantially the same way. Apparently, the exact nature of the cavities within the particular sample of wood, their geometry, interconnections, locations, density, etc. can have an significant and non-reproducible effect on measured electrical of various samples of wood.

The present invention provides a method for the electrostatic application of powder coatings to wood which leads to adequate covering properties while making use of the advantages of electrostatic coating technology. It is noted in the present invention that electrically grounding the sample of wood has a significant beneficial effect on the coating process, especially when used with tribocharging of the applied powder coating. Similar effects have also been noted by Holliday (UK Patent 2,056,885) in the context of electrostatic coatings of wood with thermally cured powders.

However, the electrical conduction properties of wood are known to be sensitive to moisture content.

It is also shown by the present invention that humidity control of the wood specimen before and during powder application can have an important effect in improving the coating properties of the powder.

In addition, moderate heating of the sample of wood is also demonstrated in the present invention to provide definite advantages in filling in textured regions of the wood surface and otherwise providing adequate coverage of all areas of the workpiece. Heating protocols leading to improved powder coatings, yet not exceeding heating guidelines generally considered acceptable for wood products, are also described. Specific formulations of powder coatings are also described in accordance with the present invention, making use of flow control agents (to control the temperatures at which the powder coating flow adequately into all regions of the wood to be coated).

Recently, the European Community has sponsored a study on the powder coating of MDF, wood and wood-related products under the SPRINT-Programme for Technology Transfer and Innovation (August 1993, Peter Svane). This SPRINT report describes uv curable powder coatings for MDF and wood-related products. However, the importance of the electrical properties of the wood or MDF workpiece in obtaining good powder coatings is not described. As a result, the effects of humidity control of the wooden substrate prior to powder application is not described, nor is the importance of electrically grounding the substrate during application. However, the present invention describes specific formulations of uv curable powder coatings distinct from, and leading to superior performance, from the formulations described in this SPRINT report.

The typical curing agents used in powder coating heretofore are thermosetting in which, under application of suitable heat from a bake oven or heating lamps, the curing agent causes the powder coating to harden into the desired finish. Epoxy and other heat-induced chemical reactions are typical means by which thermosetting curing occurs. However, as noted above, thermal curing of powder coatings offers several disadvantages. Certain substrate materials (such as wood or certain plastics) may not be heated above a certain temperature without causing harm to the material. This can place serious or insurmountable challenges in the way of thermal cures in striving to lower the cure temperature to an acceptable level while retaining the desired coating properties. UV curable coatings, such as the present invention, would be one way around thermal curing for heat-sensitive workpieces.

Also, certain workpieces are difficult to heat to the desired level due to the sheer bulk of the workpiece. For example in the application of powder coatings to certain motor vehicles is it not practical to heat the entire vehicle in its assembled state to the required curing temperature. Infra-red heating elements may ameliorate this problem somewhat. A uv curable powder coating would offer significant advantages in processing speed for large workpieces.

However, in the combination of uv curable coatings and powder coating technology additional complications and technical challenges arise. There are two basic grounds: 1) Low molecular mobility in solids, and 2) increased difficulty of light penetration through a solid for total curing of the entire film thickness ("through cure").

In a solid, such as a powder to be applied as a coating, molecular mobility and diffusion are essentially eliminated for all temperatures significantly below the flow temperature of the coating. Thus, in general, chemical species would need to be introduced into the powder formulation in sufficient concentrations and dispersions to lead to reactions in situ. Otherwise, chemical reactions for photocuring may proceed at slow, commercially unacceptable rates, thereby negating one of the major advantages to be gained from the use of uv curable coatings in the first place (that is, processing speed). This lower molecular mobility in solids places additional restrictions on the species, and combination of species, which may be used in powder coatings to be cured by uv radiation.

In addition, the use of powder coatings exacerbates the problems present in uv curing of thick liquid films. A primary difficulty in the uv curing of thick liquid films involves the penetration of the curing radiation throughout the entire thickness of the coating to give adequate "through cure". In the initial stages of curing, the incident radiation is typically absorbed by the photoinitiators present in the uppermost layers of coating. Two effects follow: 1) The upper levels of coating are fully cured well before the curing process is complete, and 2) The curing radiation is absorbed in the upper levels and thereby prevented from reaching the lower levels of the coating for adequate cure in these lower levels. Exposure to massive amounts of radiation to insure full penetration can lead to premature degradation of the properties of the cured upper layers (effectively accelerating the aging of the top levels of coating before the curing of the lower levels is even completed). This also has the disadvantage of increasing processing costs by requiring the generation and use of considerable radiation merely to have sufficient radiation survive the absorption in upper levels to achieve adequate through cure. Therefore, it is a serious problem in the choice of photoinitiators to insure adequate through cure without excessive exposure to radiation. The prospective use of self-bleaching photoinitiators is described above. The more typical approach, however, is to carefully tailor the formulation of photoinitiator and resin to balance absorption with penetration, and balance cure speed with economic use of radiation. In so far as solids typically present broader spectral absorptions than liquids, the problem of through curing is typically more challenging for powder coatings than for liquid coatings.

Additional technical problems arise when pigments are added to the coatings (both liquid and solid coatings). The curing radiation is typically uv or electron beam while the function of pigments is to provide color (that is, selective absorption and emission of electromagnetic radiation) in the visible portion of the spectrum. Thus, it is not inherently necessary that pigments interfere with the radiation curing of the coating since different portions of the electromagnetic spectrum are involved. However, in most practical pigmented systems in use today, the pigment provides an additional strong absorber of curing radiation, seriously complicating the uv curing of the coating. The conventional approach to the problem is to look for formulations and combinations of photoinitiators, pigments, and sources of curing radiation (typically uv lamps) which allow penetration of useful amounts of curing radiation through the pigment for absorption by the photoinitiator and photocuring of the resin (and pigmented additive therein).

It is generally true that the absorption spectrum of a molecule becomes more broad when in the solid state than when in either liquid or gas phase. Typically, the strong intermolecular forces associated with the formation of a solid will affect and broaden the absorption spectrum of a molecule. Thus, when overlapping and competing absorptions are a problem (as in the curing of thick, pigmented coatings), the problem tends to become worse in solids.

The present invention also considers the use of pigmented powder coatings, typically white or black coatings, in addition to clear coatings A choice of pigments is made so as to give adequate uv curing properties when used with certain photoinitiators, resins and appropriate sources of uv radiation. It is expected that colors (other than white or black) may also be produced by the methods of the present invention, modified only insofar as pigments recommended by the vendors for use with appropriate photoinitiators are substituted for the pigments discussed herein.

The prospective advantages of combining uv curable materials with powder coatings have attracted some previous work. In addition to the SPRINT work noted above, the invention of Iwase et. al. (U.S. Pat. No. 3,974,303 and UK Patent No. 1,446,119) describes a uv curable powder coating. This coating process involves heating to a molten state following deposition on the substrate material but prior to exposure to uv radiation (or possibly concurrently with the exposure to the curing uv radiation). This patent claims to avoid, or at least mitigate, some of the problems associated with simultaneous melting and thermal curing (such as bubble formation). Heating the coated workpiece to a temperature sufficient to cause the powder coating to flow and coalesce into a smooth film is necessary in virtually any powder coating process, including the process of Iwase, as well as in the present invention. However, it is important for many applications that the temperature be kept as low as possible. The Iwase process typically operates in the temperature range of 110 to 120 deg. C. The present invention is an improvement on the Iwase process, and upon their formulation, in that specific formulations of uv curable resins (and other additives of the present invention) into a powder coating are described which lead in the present invention to superior performance in several aspects. In particular, unlike the work of Iwase, the present invention provides uv curable powder formulations capable of producing good surface finishes and surface properties at temperatures significantly below that of Iwase. As we discuss below, the present uv curable powder coatings are typically capable of flowing and coalescing at temperatures in the range 85 to 100 deg. C. Certain materials suffer degradation in properties at temperatures above this level. Also, the use of lower temperatures provides savings in the energy required by the process irrespective of the properties of the substrate.

The work of McGinniss (U.S. Pat. Nos. 4,129,488 and 4,163,810) describes novel chemical compounds containing epoxy functionality bonded with ethylenically unsaturated polymers to form a compound, claimed by the inventor, to be suitable for uv curable powder coatings. The present invention does not involve a synthesis of specific and novel compounds for use as uv curable resins. Rather, the present invention comprises a formulation of known compounds, typically used for liquid coatings, but formulated and applied specifically for powder coatings.

The present invention relates to a formulation of compounds which leads to uv curable powder coatings without the necessity of synthesizing special compounds, as in the work of McGinniss, and leading to superior performance on certain substrates from the work of Iwase. The present invention demonstrates the formulation and use of uv curable powder coatings from chemicals typically available for use in liquid uv curable coatings. Thus, the formulation and processing of the present invention offers the possibility of uv curable powder coatings from reasonably available compounds and improved performance in certain applications on certain workpieces.

SUMMARY AND OBJECTS OF THE INVENTION

The present invention relates to powder coatings curable by exposure to radiation, typically ultraviolet radiation, and the electrostatic deposition thereof onto wood substrates. Free radical curing coatings are described based upon acrylourethane resins, unsaturated polyester resins and mixtures of the foregoing. For free radical curing coatings, morpholino containing photoiniators, phosphine containing photoiniators, phenol containing photoiniators and ketal containing photoinitiators (and mixtures thereof) are typically employed. Opacifiers, flow agents, plasticizers, and thioxanthone containing synergists, are also included. Degassing agents (waxes) may also be included in the formulation, both for degassing the powder coating during cure, and to assist in degassing those substrates (such as wood) which are prone to forming bubbles during cure. Flow agents are also typically included in the formulation. For use with powder coatings, solid or solidified photoinitiators are preferred in the practice of the present invention.

The present invention also involves a method for depositing such powders, electrostatically, onto wooden materials such as conventional wood, fiber board, medium-density-fiber-board ("MDF") and analogous wood-related products. A wooden substrate to be coated is electrically grounded during the application of the powder coating. Control of the environmental humidity to which the substrate is exposed is typically helpful in increasing the moisture content of the wooden substrate, and, hence, increasing its electrical conductivity. The wooden substrate may be preheated prior to application of the powder coating to a temperature below that at which irreversible damage to the structure or appearance of the substrate occurs; typically in the range of 165–190 deg. F. Electrostatically charged uv curable powder formulated according to the present invention is directed onto the substrate, typically by means of tribocharging and deposition from the end of the tribocharging device. A second heating step may be employed to typically 165–190 deg F. prior to curing.

A primary object of the present invention is to provide a powder coating curable by means of exposure to radiation.

Another object of the present invention is to provide a powder coating curable by means of exposure to ultraviolet radiation.

Yet another object of the present invention is to provide a powder coating, curable by exposure to radiation, based upon free radical curing.

Yet another object of the present invention is to provide a powder coating, curable by exposure to radiation, based upon free radical curing resins of the general chemical types; acrylourethane resins, unsaturated polyester resins and mixtures of the foregoing.

Another object of the present invention is to provide methods of preparation of radiation-curable resins suitable for application to substrates by electrostatic deposition means.

Yet another object of the present invention is to provide a uv curable powder coating suitable for use in conjunction with pigmented additives.

Another object of the present invention is to produce a uv curable powder coating suitable for use in conjunction with white or black colorants.

Another object of the present invention is to provide a method for electrostatically depositing uv curable powder coatings onto wooden substrates.

Another object of the present invention is to provide a method for electrostatically depositing uv curable powder coatings onto wooden substrates while at no time heating the substrate above levels at which irreversible damage occurs.

Yet another object of the present invention is to provide a method for electrostatically depositing uv curable powder coatings onto wooden substrates and heating said substrates to reflow said coating for healing defects.

Another object of the present invention is to control the electrical conductivity of wooden substrates prior to, and during electrostatic deposition of charged uv curable powder coatings, typically by means of controlling the humidity of the environment in which the substrate is processed.

Yet another object of the present invention is to control the conductivity of the wooden substrate by means of a conductive coating applied to the substrate prior to deposition of the uv curable powder coating.

Figure 1:
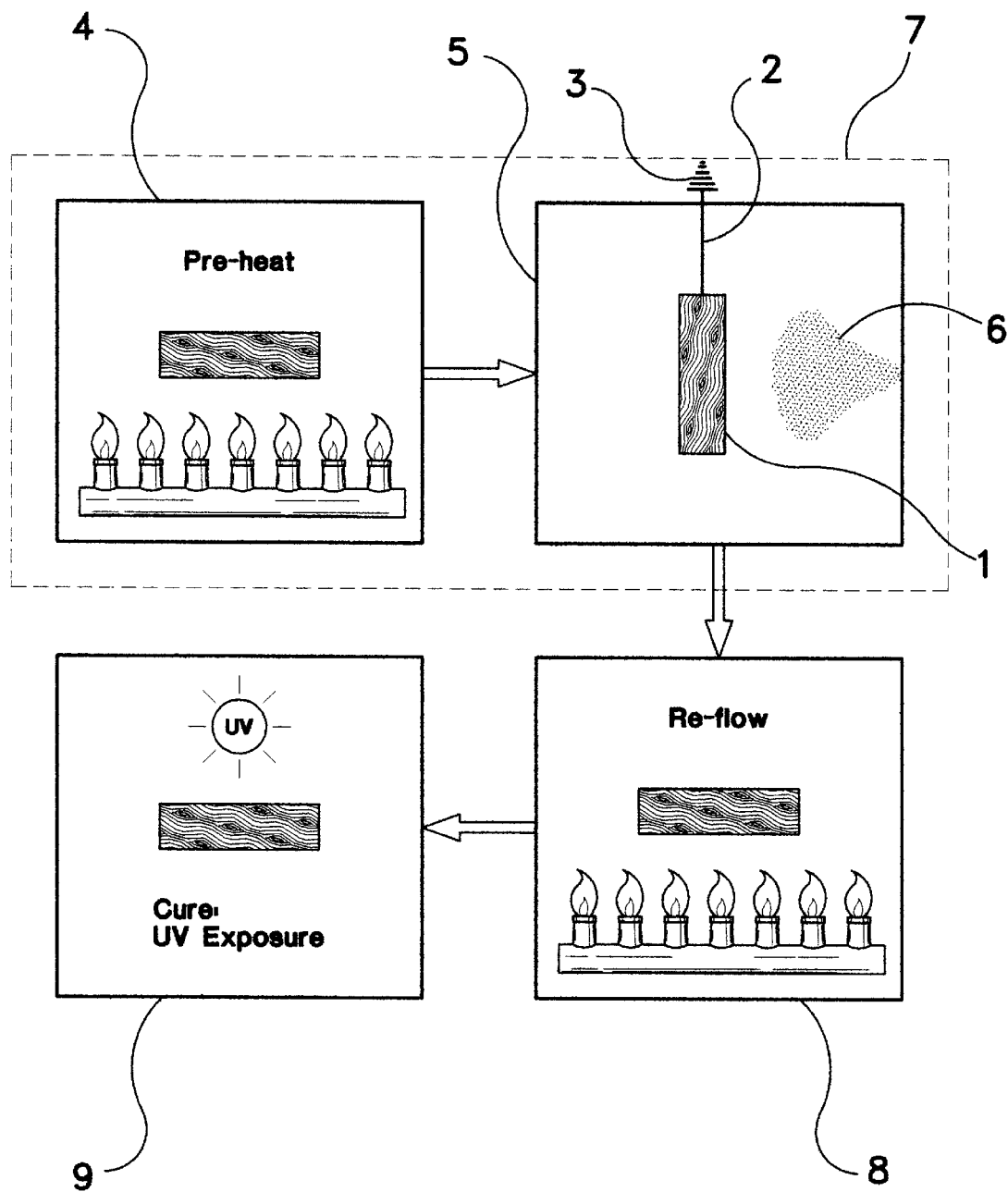
FIG. 1: A schematic diagram of the processing steps and work flow (indicated by arrows) for the electrostatic application of uv curable powder coatings onto wood according to the present invention.

DESCRIPTION OF PREFERRED
EMBODIMENTS

I. UV Curable Powder Coatings: Formulations for Free Radical Curing

The present invention relates to the use of radiation to cure powder coatings following deposition of said powder onto, typically, a wood or wood-related workpiece or substrate. Typical deposition methods would be deposition from a fluidized bed or electrostatic deposition. The most common means of electrostatic deposition would involve causing the powder to acquire an electrostatic charge (typically by means of corona discharge or tribocharging) prior to deposition of the powder onto the substrate. The particular method of deposition of the powder onto a wood substrate is discussed below.

The powder coating is typically in the form of a "resin" with numerous additives for color, charging, flow control, etc. as described in more detail below. The resin itself is typically a polymer which has unreacted functional groups capable of cross-linking, additional polymerization, or a variety of other chemical reactions leading to the final coating. This second category of chemical reactions leading to the final coating is generally referred to as "curing" the coating to distinguish from polymerization, or other reactions necessary to form the resin itself. The resin may also be known as a "prepolymer" or "oligomer" since the full polymerization (or the full expansion of molecular weight by whatever chemical reaction) has not yet occurred. However, these terms "prepolymer" and "oligomer" are more typically used in conjunction with liquid coatings cured by radiation. We will use the term "resin" herein to denote the material deposited onto the substrate prior to the occurrence of the final curing or polymerization reactions. The present invention, in contrast to the work of McGinniss cited above, is not directly concerned with the reactions (polymerization or otherwise) going into the formation of the resin. Rather, the present invention is concerned with a particular formulation of resins and additives capable of curing by means of radiation, typically ultraviolet radiation (and capable of flowing at significantly lower temperatures than that described by the Iwase patent above), leading to an improved powder coating.

In the case of typical thermosetting powder coatings, the application of heat is used to flow the powder into a uniform film and to cause the curing reactions to proceed. The present invention uses, typically, uv radiation for curing the powder coating, but still has the need for modest heating to cause the powder coating to flow into a uniform covering of the substrate. The present invention will generally work best when the substrate is heated no higher than 100 degrees Celsius. Heating substantially above this temperature will tend to re-introduce into the coating system many of the problems associated with genuine thermosetting resins, and which are sought to be avoided by the use of uv cures. In particular, heating to such temperatures (typically above approximately 90 Deg. C.) is to be avoided when the substrate is wood. However, it is frequently helpful to use in combination with the uv curable resin a plasticizer compound for the lowering of the melting-flowing temperature of the resin. Specific plasticizers will be discussed in more detail below in conjunction with the specific resin systems of the present invention.

UV radiation itself may be a source of heat, as in the British patent of Holliday (UK Patent GB 2,056,885) who uses uv radiation as one possible means to heat the coated surface to a temperature sufficiently high for thermosetting resins to cure. However, unlike Holliday, the curing mechanism of the present invention is photopolymerization initiated by uv absorption, not thermal curing. Modest heating incidental to uv curing may take the place of a separate heating-flowing step prior to cure in certain cases. In any event, the maximum temperature reached by the surface of the substrate in the practice of the present invention is well below that necessary for cure in the thermosetting systems of Holliday.

The present invention distinguishes two general classes of ultraviolet curable coatings: cationic and free radical. In the case of cationic curable coatings, the reactive functionality on the resin reacts in the curing step by means of positively charged chemical species. The most common type of cationic curable resin (uv curable or otherwise) are probably resins based upon epoxide groups, commonly cycloaliphatic epoxides, although vinyl ethers are also frequently used. In the case of free radical curable resins, the reactive functionality of the resin reacts during the curing step by means of free radical (uncharged) intermediate species. The most common free radical curing resin are perhaps those based upon unsaturated carbon-carbon bonds.

The present invention relates to powder coatings curable by means of free radical curing mechanisms. There is considerable technology related to liquid coatings for free radical uv curable coatings. However, the use of such technology in the field powder coatings is not well known. As described above, the use of powder coatings introduces several additional complications into the chemical nature and properties required of the powder coating during application and cure. Modifications of coating formulation, additives, etc. for specific use with powder coatings form an important component of the present invention.

A free radical curing powder coating based typically upon acrylourethane resins or unsaturated polyester resins, as generally depicted in Equations (1) and (2), are found to be particularly advantageous in the practice of the present invention.

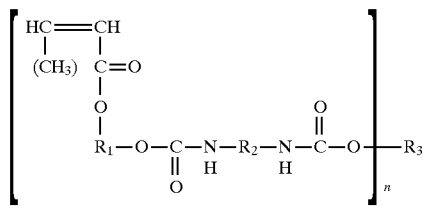

n = 1, 2, 3
$R_1$ = aliphatic
$R_2$ = aliphatic, alicyclic or aromatic
$R_3$ = hydrocarbon backbone for mono-ol, diol, triol reactant for n = 1, 2, or 3 respectively Acrylourethane Containing Resin -continued

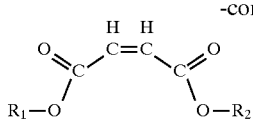

Maleate containing resins

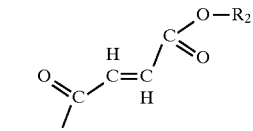

Fumarate containing resins $R_1$, $R_2$ = oligomer or polymer consisting of glycols and mono or polybasic acids Unsaturated Polyester Resins One form of these resins comprise developmental stage products produced by the Hoechst Corporation and supplied in the form of powders under the tradenames VAN-1743 (for the unsaturated polyester resin) and VXL-1385 (for the acrylourethane resin). The work of the present invention has found that these resins are particularly suited for use in powder coatings. However, other unsaturated polyester resins supplied by Pioneer Chemical under the tradenames PIOESTER 275 and PIONEER P-1942, P-1937, Reichold ATLAC 363E, ATLAC 352, and DION 6694 ES have also been employed with satisfactory results.

Hereinafter we will use the tradenames of the compounds provided by certain vendors merely as shorthand for the chemical structures given in the equations. When first introduced by tradename and vendor, a chemical structure or family of chemical structures will be given to make precise the chemical identity of the compounded intended in the practice of the present invention. Thereafter, we will use the vendors' tradename merely for economy of language, intending thereby to indicate the structure or family of structures previously defined.

An important component of the present invention is to produce uv curable powders involving free radical curing mechanism in which pigmented, color-carrying additives may be used, typically white or black. There are many industrial applications for clear, uv curable coatings. However, a significant drawback to many uv curable coatings is their inability to cure and form acceptable coatings when color-carrying additives ("pigments" or "colorants") are added to the formulation. As discussed above, a typical powder coating formulation involves a reasonably complex mixture of numerous components; one of which is typically a pigment, the function of which is to give the final coating the appropriate color or other appearance (metallic, etc). However, the addition of additives complicates the problem of achieving a complete cure throughout the full thickness of the coating as, typically, the pigment will make it more difficult for the curing radiation to penetrate, and hence cure, the lower layers of the coating. Thus, an important component of the present invention is to select the appropriate combination of resin, photoinitiators, pigment and radiation source (typically by means of a suitable choice of uv lamp) to achieve adequate curing throughout the thickness of the coating in reasonable times and with reasonable uv intensity.

It is not necessary for a single photoinitiator to be used in the practice of the present invention, although this is envisioned to be the most common mode of practice. Mixtures of photoinitiators for different properties, such as wavelength specificity, may be used as mixtures in special cases.

For the practice of the present invention, the free radical curing resins of Equation (1) or (2) are typically used along with selected photoinitiators of the phenol type (such as DAROCURE 2959 from Ciba-Geigy as shown in Equation (3)), or morpholino containing photoinitiators (such as IRGACURE 369 or 907 from Ciba-Geigy, shown in general in Equations (4) and (5) respectively). We follow herein the customary usage in the field to denote as "phenol containing photoinitiators" those photoinitiators known in the art for their properties as photoinitiators and containing at least one phenol functional group (oxybenzene). In general, other functional groups may be directly attached to the benzene ring in such phenol containing photoinitiators. A typical example as preferred in the practice of the present invention is shown in Equation (3). Other phenol containing photoinitiators are well known in the field.

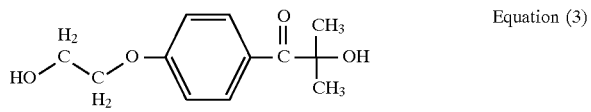

Equation (3)

1-{4-(2-hydroxyethoxy)phenyl}-2-2hydroxy-2-methyl-propan-1-one
Darocure 2959

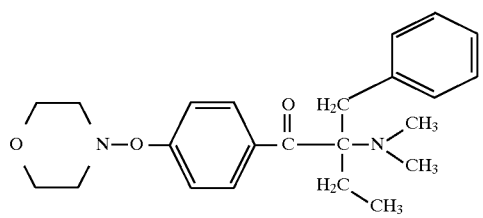

Equation (4)

2-benzyl-2-dimethylamino-1-(4-morpholinophenyl)-butan-1-one
Irgacure 369

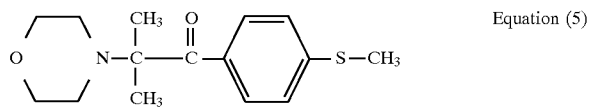

Equation (5)

2-methyl-1-{4-(methlythio)phenyl}-2-morpholino-propan-1-one
Irgacure 907

We follow herein customary usage in the field and denote as morpholino containing photoinitiators' those photoinitiators known in the art for their photoinitiating properties and containing at least one morpholino functional group (tetrahydro-1, 4 oxazine). Typical, but not exhaustive, examples of such morpholino containing photoinitiators are shown in Equations (4) and (5). Other and related morpholino containing photoinitiators are well known in the field.

We discuss below certain complications involved in uv curing in which pigments (typically white or black pigments) are added to the formulation. For use with white pigmented powder coatings, it is found that two additional photoinitiators are generally useful, although not excluded from with clear coatings:IRGACURE 651 (Ciba-Geigy, Equation (5-1)) and LUCERIN TPO (BASF-Equation (5-2)). Equation (5-1) is one example of what is commonly known in the field as "ketal containing photoinitiator". By "ketal containing photoinitiator" we mean herein those photoinitiators known in the field for their photoinitiating properties and containing at least one ketal functional group, generally characterized by the functionality $\{-C(OR_1)(OR_2)\}$ in which $R_1$, $R_2$ denote general hydrocarbon groups. Perhaps the most common in the field is benzil dimethyl ketal, Equation 5-1, but similar and related ketal containing photoinitiators are common in the field.

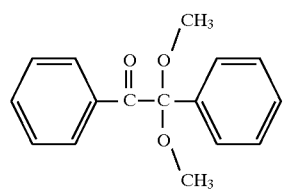

Equation (5-1)

Benzil dimethyl ketal
Irgacure 651

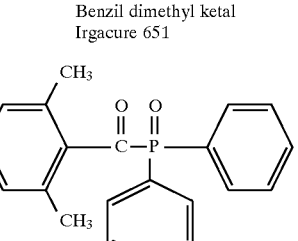

Equation (5-2)

2,4,6-trimethylbenzoyl-diphenyl-phosphine-oxide
Lucerin TPO

We follow herein the customary usage in the field to denote as "phosphine containing photoinitiators" those photoinitiators known in the art for their properties as photoinitiators and containing at least one phosphine functional group (typically, multisubstituted $PH_3$). A typical example as preferred in the practice of the present invention is shown in Equation (5-2). Other phosphine containing photoinitiators are well known in the field.

Although the photoinitiators named herein are those currently preferred for the present invention, the performance of the uv curable powder coatings under the present invention does not appear to be markedly sensitive to the particular choice of photoinitiator. Numerous photoinitiators are commercially available for use with free radical curing coatings (typically used in conjunction with liquid coatings, although their use with powder coatings may be anticipated). Many of these photoinitiators can be usefully employed depending upon the particular resin, pigments, or curing conditions to be used. Rather than include an exhaustive list of such photoinitiators here, we note that particular photoinitiators are typically recommended by the vendor of the resin, giving a clear starting point for routine experimentation. Choosing an appropriate photoinitiator, with correct spectral properties to provide acceptable curing in conjunction with the desired pigmented or other additives, thus becomes a matter of straight forward testing.

Many photoinitiators are typically supplied by the commercial vendor in the form of a liquid or a solution containing the solid photoinitiator dissolved in an appropriate solvent. This is perhaps the preferred formulation for the use of such photoinitiators for liquid uv curable coatings. However, the present invention is concerned with powder coatings. For this purpose, it is found that photoinitiators in the form of a solid give improved performance. Thus, one feature of the present invention is to evaporate the solvent and use the photoinitiator in the form of a solid. In general, any materials which are commonly in the form of a liquid are suspect in the practice of the present invention. The processing of the uv curable powder, when substantial liquids are present in at least one of the components, may cause improper processing to occur. Clumping, and sticking to other particles may occur, impeding the processing and application to the workpiece by means of typical powder coating procedures. Thus, in general, for the practice of the present invention for uv curable powder coatings, it is generally useful to use materials as much as possible in dry, powder form. This may involve preliminary evaporation or other processing steps for those materials not typically supplied as powder. Although described herein in conjunction with certain photoinitiators, these procedures are generally applicable along with any of the component chemicals used to practice the present invention.

It is often useful in the practice of the present invention to use a co-photoinitiator. The purpose of the co-photoinitiator is to provide a second, independent, photoinitiator to allow for absorption of uv radiation at slightly different wavelengths from the primary photoinitiator, and to provide a second independent source of free radical reactive species. For the present invention using the particular resins and photoinitiators described above, a co-initiator in the general form of a thioxanthone species (as shown generally in Equation (6) )may be added to the free radical curing resin Equation (1) or (2).

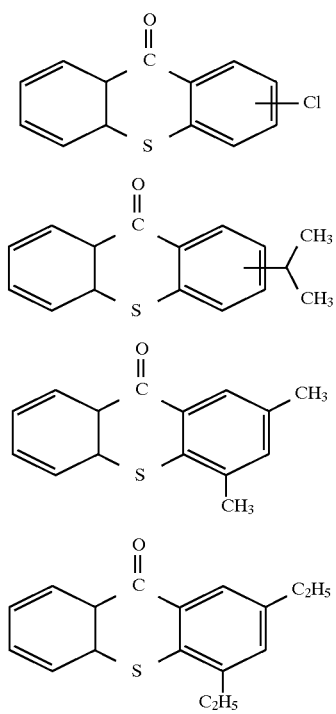

Typical thioxanthone derivatives

We have described above typical resins and photoinitiators used in the production of uv curable powder coatings in which free radical cure is the chemical curing mechanism. In addition to resins and photoinitiators, it is often useful to include a "synergist" or "photosensitizer". The purpose of a photosensitizer is to increase the range of uv wavelengths at which energy is absorbed from the from the incident radiation, increasing thereby the efficiency of light utilization by the photosensitizer-photoinitiator system. The photosensitizer will typically absorb a uv photon of a wavelength not readily absorbed by the photoinitiator itself. Energy (or perhaps an electron) will then be transferred from the photosensitizer to the photoinitiator, allowing the reaction to commence, in effect initiated by a photon not absorbed by the photoinitiator. Typically, ethyl-p-(dimethylamino) benzoates of the general chemical structure shown in Equation (7) have proven useful to include in the formulation of uv curable powder coatings in the present invention, although other amino-functional molecules will also work. In any event, it is preferred in the practice of the present invention that the compound be solid or able to be solidified prior to use.

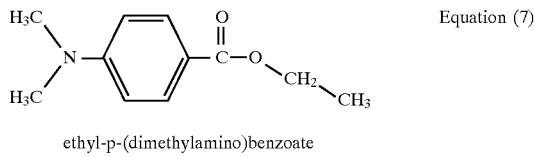

ethyl-p-(dimethylamino)benzoate

An important feature of the present invention is to provide uv curable powder coatings with low flow temperatures, typically less than 100 deg. C. In order to achieve lower flow temperatures, an additive in the form of a "plasticizer" is added. To lower the flow temperature of the free radical curing resins of the present invention, it is found that a combination of benzoates is generally useful. Commercially available benzoate plasticizers, such as BENZOFLEX 352 or BENZOFLEX 404 are typical plasticizer additives for the present invention, the general structures of which are given in Equations (8) and (9).

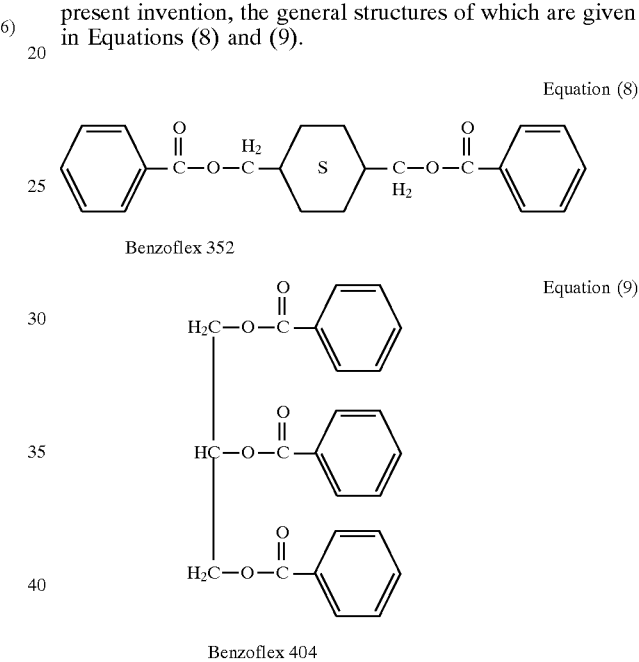

It is also desirable in the practice of the present invention to include pigmented powders in the formulation ("opacifiers") along with the polymerizable resin, photoinitiator, etc. However, as noted above, this complicates the selection of photoinitiator as the opacifier typically will reflect or absorb uv radiation, reducing the cure efficiency. Thus, successful uv curable powder coatings involve making a judicious choice of pigment, photoinitiator, resin, and radiation source (that is, emission spectrum). The problem is exacerbated for thick coatings (as generally used with powders to insure complete coverage). For thin coatings (typically less than approximately 30 micrometers), absorption of curing radiation by overlayers is not a significant problem in achieving adequate cure of underlying layers. However, for thick coatings, as in the present invention, the problem of adequate cure of the entire coating becomes significant.

The present invention has been primarily concerned with the use of white and black pigmented additives to the coating formulation. It is found that, in general, the addition of black pigments do not substantially effect the performance of an otherwise acceptable powder coating formulation. In general, a suitable formulation of uv curable powder is produced according to the methods and compounds of the present invention. It is typically found that the addition of black pigmented additives does not significantly affect the performance in terms of cure rate, cure penetration or the properties (flexibility, adhesion to substrate, solvent resistance, etc.) of the cured coating.

In contrast to the use of black opacifiers, it is found in the present invention that the use of white colorants has a substantial effect on the uv curing coatings. Therefore, in the practice of the present invention, the appropriate choice of white pigments, uv source, and photoinitiator is carefully made.

A very common white pigment used for coatings (liquid and powder) is titanium dioxide, Ti-O2. Titanium dioxide is commonly found in three crystalline forms; rutile, anatase, and brookite, all of which occur in nature. Rutile and anatase are the common forms of Ti-O2 used for white pigments. In the rutile form (the most common form of Ti-O2) the titanium atom is surrounded in the crystal by eight oxygen atoms in an octahedral configuration. In anatase, the titanium atom is surrounded by a severely distorted octahedron of oxygen atoms. This differing crystal structure leads to different uv absorption properties for the differing crystalline forms of Ti-O2.

Figure 2:
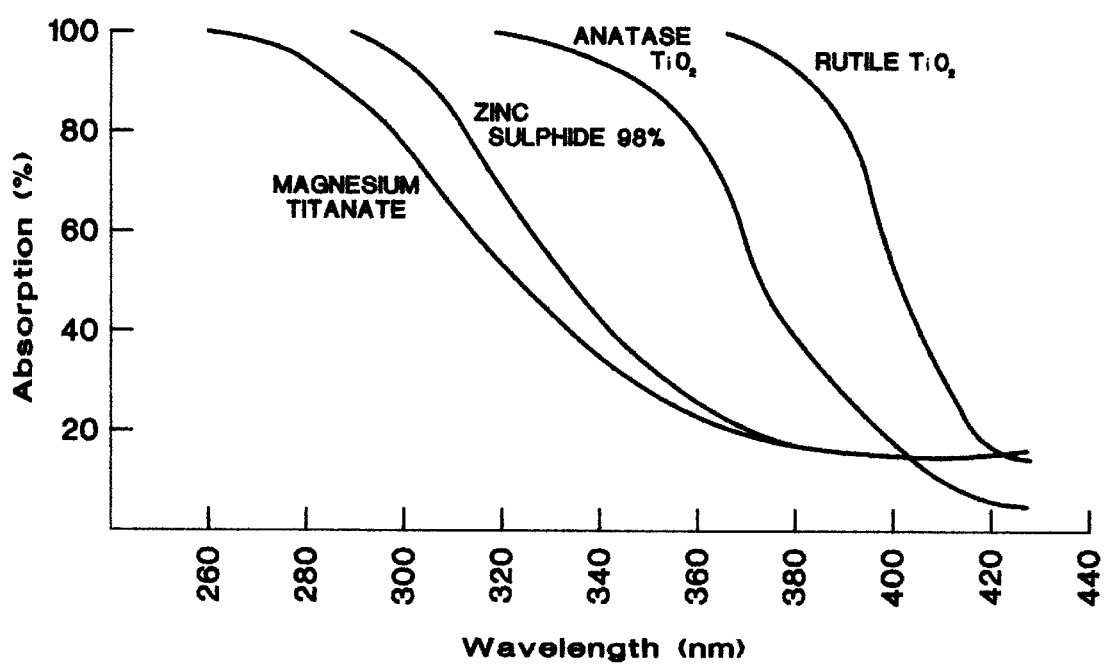
FIG. 2: Absorption spectra of typical white pigments from "The Use of UV Technology to Produce Thick Pigmented Coatings," by Peter G. Garratt, in *Radiation Curing of Polymer II. The Proceedings of the Third International Symposium Organized by the North West Region of the Industrial Division of the Royal Society of Chemistry* U.M.I.S.T., University of Manchester, 12–14 Sep. 1990.

We show in Table I (FIG. 2) typical absorption spectra of rutile and anatase $TiO_2$ as well as other common white pigments.

In the present invention, we have found that the rutile form of solid $TiO_2$ is the preferred white pigment along with various combinations of other white pigments, ZnO, ZnS and $ZrO_2$. For the practice of the present invention, it is found that approximately 30%–40% by weight of ZnO, ZnS or $ZrO_2$ in combination with approximately 10% by weight of rutile $TiO_2$ provides an acceptable mixture of colorant additives (along with 50% by weight of the resin, typically acrylourethane mixed with unsaturated polyester as described above). However, an acceptable performance is also obtained using 30%–40% anatase $TiO_2$.

Along with the use of a pigment, the choice of photoinitiator is also important in achieving adequate through cure. For the present invention, we find that use of a phosphine containing photoinitiator (such as Lucerin TPO, Equation 5-2) provides acceptable uv absorption and cure for wavelengths having adequate penetration of the white pigments as described above when used with thick coatings. For thin coatings in which penetration of the coating is much less demanding, it is found that Irgacure 651 (see above) provides acceptable performance at reduced costs.

Other acyl phosphines are beginning to become commercially available. Among these is the Ciba-Geigy product known commonly by the acronym "BAPO" as shown in Equation (10). This is a solid material under normal conditions but is, at present, offered only in a solution of "DAROCURE 1173" (Equation (11)), typically 75% DAROCURE-1 173, 25% BAPO.

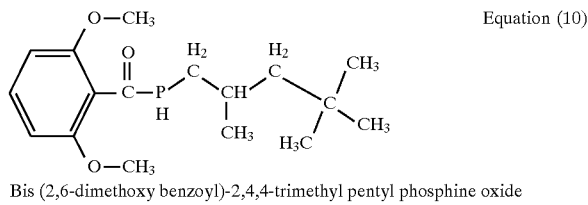

Bis (2,6-dimethoxy benzoyl)-2,4,4-trimethyl pentyl phosphine oxide "BAPO"

Equation (10)

-continued

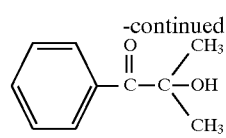

α-hydroxy acetophenone
Darocure 1173

Equation (11)

As noted below in connection with certain examples of uv curable coatings, phosphine containing photoinitiators of the general type shown in Equations (10) and (11) are useful in certain instances, typically involving white pigmented coatings. The use of co-photoinitiators is also shown to be useful in the practice of the present invention, especially with pigmented coatings, in which one photoinitiator tends to assist in achieving adequate through cure while another tends to favor surface curing.

The particular choice of uv radiation source is also important such that adequate emission of uv curing radiation occurs at wavelengths not thoroughly absorbed by the pigment. UV lamps commonly are sold in several varieties. The Fusion "H" bulb is a typical uv source consisting primarily of an electrical discharge in medium pressure mercury vapor. The Fusion "D" bulb is similar to the "H" bulb but, in addition, contains a small quantity of metal halide. The "V" bulb is similar to the "D" bulb in that it contains a small amount of metal halide, but emits a larger fraction of its radiant energy at longer wavelengths. A spectral emission comparison of the "H", "D", and "V" bulbs is given in Table II. Mercury lamps containing such metal halide are conventionally known as "doped" lamps. We follow this convention and used "doped" lamp herein to denote mercury vapor lamps with metal halide additives, typically the "D" and "V" bulbs.

"Medium pressure" as used herein is a term of art, well known in the field of mercury pressure lamp technology. Typically, "medium pressure mercury lamps' will contain vapor at a pressure of approximately 1.5 to 2.5 atmospheres pressure, and produce illumination of 200 to 600 watts per linear inch of discharge.

It is found in the practice of the present invention that the "D" or "V" bulbs enhance the cure of the pigmented coatings (white or black) due to having an emission spectrum lying outside of the absorption of the opacifiers used in the present invention but reasonably coincident with the absorption of the phosphine containing photoinitiators. Hence, the "D" or "V" bulbs are the currently preferred uv exposure technique for pigmented (including white) coatings. The "H" bulb has been found to perform acceptably for the clear coatings tested herein.

II. UV Curable Powder Coatings: Examples Including Clear, White and Black

Several examples of uv curable powder coatings are presented. Unless otherwise stated, these powders were applied to a metal (typically steel) test substrate, approximately 3" by 5" in most cases, by means of corona discharge electrostatic deposition. As noted above, one of the important reasons for the development of uv curable powder coatings is to be able to coat heat-sensitive substrates without the necessity of heating the substrate to elevated temperatures for thermal curing. However, for testing the properties of the powder and the uv cure, it is not necessary to introduce the additional complications brought about by using uncommon substrates, such as wood or heat-sensitive plastics. For this reason, the tests herein have been carried out using conventional metallic test panels so that deviations in test results can reliably be attributed to differences in the chemical formulation of the powder coating material itself, uncomplicated by the complexities of coating on nonuniform samples of wood. We described below in a separate section the application of certain of these powder coatings to wood.

Unless otherwise noted, all coatings were applied in thicknesses in the range typically 0.001 to 0.002 inches. All were fused at temperatures between 185–200 degrees Fahrenheit for times of typically 10–60 seconds by means of exposure to infra-red lamps, or by insertion into a convection oven for typically about 3 minutes. The precise details of heating did not appear to have an appreciable effect on the subsequent curing by uv radiation. As noted above, the heating to this low temperature is intended to fuse the powder coating into a uniform, continuous film, eliminating thereby the grain structure in the powder as originally deposited.

Three separate tests were performed on the substrates described below. A solvent resistance test was done simply by rubbing the cured coating with a swab impregnated with methyl ethyl ketone (MEK). Typically 30 rubs by hand were performed with MEK. Failure to observe any significant removal of the coating by this MEK rub was deemed acceptable performance on this test.

A flexibility/adhesion test was performed by dropping a 4 lb. weight onto the coated side of the substrate, impacting the substrate with a spherical impact point having a radius of approximately (⅝) inch. The impact makes a depression in the coated surface of the substrate. Failure to observe any visual peeling of coating from the substrate when the weight was dropped from a height of at least 7.87 inches was deemed acceptable performance on this test.

A 1% potassium permanganate solution stain test was performed to test for any unreacted unsaturation remaining in the coating following exposure to uv radiation. Acceptable performance on this test resulted when failure to stain showed adequate curing following exposure to uv curing radiation.

All examples given herein showed acceptable performance on the above three tests. At the present stage of development of the present uv curable powder coatings, it is not possible to describe a single best-performing coating as certain coatings perform better in certain tests but not as well in others (although still acceptable). Also, at the present stage of development, an exhaustive experimental grid of tests has not been carried out, making it impossible and possibly misleading to point to a single "best" formulation. However, it is believed that the basic guidelines for formulation described herein provide ample guidance for the developmental chemist to formulate obvious modifications meeting his or her particular performance needs.

EXAMPLES I

CLEAR COATINGS

The following clear coatings were cured using an "H" bulb as described above with total exposures from approximately 2.4 to 7.5 Joules/(sq. cm.). Acceptable performance and through cure was observed for all cases.

I.A:

| | |
|---|---|
| Unsaturated Polyester (Hoechst VAN 1743) | 424.3 gms |
| Acrylourethane (Hoechst VXL 1385) | 181.9 gms |
| Photoinitiator (Irgacure 907) | 19.5 gms |
| Plasticizer (Benzoflex 352) | 70.0 gms |
| Degassing Agent (Benzoin) | 2.8 gms |
| Flow Agent (Troy EX 486) | 21.0 gms. |
| Wax (Petrac Slipquick) | 21.6 gms |
| Total | 741.1 gms |

I.B.:

| | |
|---|---|
| Unsaturated Polyester (Hoechst VAN 1743) | 303.1 gms |
| Acrylourethane (Hoechst VXL 1385) | 303.1 gms |
| Photoinitiator (Irgacure 907) | 16.2 gms |
| Plasticizer (Benzoflex 352) | 70.0 gms |
| Degassing Agent (Benzoin) | 2.8 gms |
| Flow Agent (Troy EX 486) | 21.0 gms. |
| Wax (Petrac Slipquick) | 21.6 gms |
| Total | 737.8 gms |

I.C:

| | |
|---|---|
| Unsaturated Polyester (Hoechst VAN 1743) | 181.9 gms |
| Acrylourethane (Hoechst VXL 1385) | 424.3 gms |
| Photoinitiator (Irgacure 907) | 16.2 gms |
| Plasticizer (Benzoflex 352) | 70.0 gms |
| Degassing Agent (Benzoin) | 2.8 gms |
| Flow Agent (Troy EX 486) | 21.0 gms. |
| Wax (Petrac Slipquick) | 21.6 gms |
| Total | 737.8 gms |

I.D.

| | |
|---|---|
| Unsaturated Polyester (PIOESTER 275) | 417.5 gms |
| Acrylourethane (Hoechst VXL 1385) | 178.9 gms |
| Photoinitiator (Irgacure 907) | 13.5 gms |
| Plasticizer (Benzoflex 352) | 66.3 gms |
| Degassing Agent (Benzoin) | 2.8 gms |
| Flow Agent (Troy EX 486) | 21.0 gms. |
| Total | 700.0 gms |

I.E:

| | |
|---|---|
| Unsaturated Polyester (PIONEER P-1937) | 417.5 gms |
| Acrylourethane (Hoechst VXL 1385) | 178.9 gms |
| Photoinitiator (Irgacure 907) | 13.5 gms |
| Plasticizer (Benzoflex 352) | 66.3 gms |
| Degassing Agent (Benzoin) | 2.8 gms |
| Flow Agent (Troy EX 486) | 21.0 gms. |
| Total | 700.0 gms |

I.F.

| | |
|---|---|
| Unsaturated Polyester (PIONEER P-1942) | 417.5 gms |
| Acrylourethane (Hoechst VXL 1385) | 178.9 gms |
| Photoinitiator (Irgacure 907) | 13.5 gms |
| Plasticizer (Benzoflex 352) | 66.3 gms |
| Degassing Agent (Benzoin) | 2.8 gms |
| Flow Agent (Troy EX 486) | 21.0 gms. |
| Total | 700.0 gms |

I.G:

| | |
|---|---|
| Unsaturated Polyester (Hoechst VAN 1743) | 357.8 gms |
| Acrylourethane (XJH1-56, aliphatic acrylourethane, Bomar Co.) | 153.4 gms |
| Photoinitiator (Irgacure 651) | 11.6 gms |
| Plasticizer (Benzoflex 352) | 56.8 gms |
| Degassing Agent (Benzoin) | 2.4 gms |
| Flow Agent (Troy EX 486) | 18.0 gms. |
| Total | 600.0 gms |

Note: XJH1-56 is an acrylourethane of the form of Equation (1) derived from a diol.

EXAMPLE II

WHITE COATINGS

The following white coating were cured using "D" and "V" bulbs as above with total exposures from approximately 4.8 to 1.73 Joules/(sq. cm.) Acceptable performance and through cure was observed for all cases.

II.A:

| | |
|---|---|
| Unsaturated Polyester (Hoechst VAN 1743) | 239.7 gms |
| Acrylourethane (Hoechst VXL 1385) | 102.7 gms |
| Photoinitiator (Irgacure 907) | 12.6 gms |
| Co-Photoinitiator (Lucerin TPO) | 12.6 gms |
| Plasticizer (Benzoflex 352) | 11.4 gms |
| Plasticizer (Benzoflex 404) | 26.6 gms |
| Degassing Agent (Benzoin) | 1.7 gms |
| Flow Agent (Troy EX 486) | 12.6 gms. |
| White Pigment (ZnS) | 280.0 gms |
| Total | 699.9 gms |

II.B:

| | |
|---|---|
| Unsaturated Polyester (Hoechst VAN 1743) | 258.9 gms |
| Acrylourethane (Hoechst VXL 1385) | 111.0 gms |
| Photoinitiator (Irgacure 907) | 13.7 gms |
| Co-Photoinitiator (Lucerin TPO) | 13.7 gms |
| Plasticizer (Benzoflex 352) | 12.3 gms |
| Plasticizer (Benzoflex 404) | 28.8 gms |
| Degassing Agent (Benzoin) | 1.8 gms |
| Flow Agent (Troy EX 486) | 13.7 gms. |
| White Pigment (TiO$_2$) | 245.0 gms |
| Total | 698.9 gms |

II.C:

| | |
|---|---|
| Unsaturated Polyester (Hoechst VAN 1743) | 292.0 gms |
| Acrylourethane (Hoechst VXL 1385) | 125.1 gms |
| Photoinitiator (BAPO) | 9.8 gms |
| Plasticizer (Benzoflex 352) | 46.4 gms |
| Degassing Agent (Benzoin) | 1.7 gms |
| Flow Agent (XL-496) | 14.7 gms. |
| White Pigment (ZnS) | 210.0 gms |
| Total | 699.7 gms |

II.D:

| | |
|---|---|
| Unsaturated Polyester (Hoechst VAN 1743) | 292.3 gms |
| Acrylourethane (Hoechst VXL 1385) | 125.2 gms |
| Photoinitiator (BAPO) | 4.7 gms |
| Co-Photoinitiator (Irgacure 651) | 4.7 gms |
| Plasticizer (Benzoflex 352) | 46.4 gms |
| Degassing Agent (Benzoin) | 2.0 gms |
| Flow Agent (XL-496) | 14.7 gms. |
| White Pigment (ZnS) | 210.0 gms |
| Total | 700.0 gms |

II.E:

| | |
|---|---|
| Unsaturated Polyester (Hoechst VAN 1743) | 208.6 gms |
| Acrylourethane (Hoechst VXL 1385) | 89.4 gms |
| Photoinitiator (Lucerin TPO) | 7.0 gms |
| Co-Photoinitiator (Irgacure 651) | 7.0 gms |
| Plasticizer (Benzoflex 352) | 9.9 gms |
| Plasticizer (Benzoflex 404) | 23.2 gms |
| Degassing Agent (Benzoin) | 1.4 gms |
| Flow Agent (XL-496) | 14.7 gms. |
| White Pigment (ZnO) | 280.0 gms |
| Total | 641.2 gms. |

II.F:

| | |
|---|---|
| Unsaturated Polyester (Hoechst VAN 1743) | 247.0 gms |
| Acrylourethane (Hoechst VXL 1385) | 105.9 gms |
| Photoinitiator (Irgacure 907) | 1.7 gms |
| Co-photoinitiator (thioxanthone) | 1.1 gms |
| Plasticizer (Benzoflex 352) | 11.8 gms |
| Plasticizer (Benzoflex 404) | 27.4 gms |
| Degassing Agent (Benzoin) | 12.6 gms |
| Flow Agent (Troy EX 486) | 1.7 gms. |
| White Pigment (ZnS) | 280.0 gms |
| Total | 689.2 gms. |

II.G:

| | |
|---|---|
| Unsaturated Polyester (Hoechst VAN 1743) | 245.0 gms |
| Acrylourethane (Hoechst VXL 1385) | 105.0 gms |
| Photoinitiator (Lucerin TPO) | 8.4 gms |
| Plasticizer (Benzoflex 352) | 38.9 gms |
| Degassing Agent (Benzoin) | 1.7 gms |
| Flow Agent (Troy EX 486) | 12.6 gms. |
| White Pigment (Rutile TiO$_2$:TIONA RCL6) | 70.0 gms. |
| White Pigment (ZnS) | 210.0 gms |
| Total | 691.6 gms. |

II.H:

| | |
|---|---|
| Unsaturated Polyester (Hoechst VAN 1743) | 1352.9 gms |
| Acrylourethane (Hoechst VXL 1385) | 579.8 gms |
| Photoinitiator (Lucerin TPO) | 45.4 gms |
| Co-Photoinitiator (benzyl dimethyl ketal) | 45.4 gms |
| Plasticizer (Benzoflex 352) | 64.4 gms |
| Plasticizer (Benzoflex 404) | 150.3 gms. |
| Degassing Agent (Benzoin) | 9.1 gms |
| Flow Agent (Resiflow P-67 from Estron, Inc.) | 22.7 gms. |
| White Pigment (Rutile TiO$_2$:TIONA RCL6) | 454.0 gms. |
| White Pigment (ZnS) | 1816.0 gms |
| Total | 4540.0 gms. |

II.I:

| | |
|---|---|
| Unsaturated Polyester (Hoechst VAN 1743) | 250.3 gms |
| Acrylourethane (Hoechst VXL 1385) | 107.3 gms |
| Photoinitiator (Lucerin TPO) | 8.4 gms |
| Co-Photoinitiator (benzyl dimethyl ketal) | 8.4 gms |
| Plasticizer (Benzoflex 352) | 11.9 gms |
| Plasticizer (Benzoflex 404) | 27.8 gms. |
| Degassing Agent (Benzoin) | 1.7 gms |
| Flow Agent (Resiflow P-67 from Estron, Inc.) | 4.2 gms. |
| White Pigment (Anatase TiO$_2$) | 180.0 gms |
| Total | 600.0 gms. |

II.J:

| | |
|---|---|
| Unsaturated Polyester (Hoechst VAN 1743) | 208.6 gms |
| Acrylourethane (Hoechst VXL 1385) | 89.4 gms |
| Photoinitiator (Lucerin TPO) | 7.0 gms |
| Co-Photoinitiator (benzyl dimethyl ketal) | 7.0 gms |
| Plasticizer (Benzoflex 352) | 9.9 gms |
| Plasticizer (Benzoflex 404) | 23.2 gms. |
| Degassing Agent (Benzoin) | 1.4 gms |
| Flow Agent (Resiflow P-67 from Estron, Inc.) | 3.5 gms. |
| White Pigment (Rutile TiO$_2$:TIONA RCL6) | 70.0 gms. |
| White Pigment (ZrO$_2$) | 280.0 gms |
| Total | 700.0 gms. |

EXAMPLE III

BLACK COATING

The following black coating was cured using an "H" bulb as described above with total exposures from approximately 2.4 to 7.5 Joules/(sq. cm.). Acceptable performance and through cure were observed.

III.A:

| | |
|---|---|
| Unsaturated Polyester (Hoechst VAN 1743) | 409.7 gms |
| Acrylourethane (Hoechst VXL 1385) | 175.6 gms |
| Photoinitiator (Irgacure 369) | 16.3 gms |
| Plasticizer (Benzoflex 352) | 19.5 gms |
| Plasticizer (Benzoflex 404) | 45.5 gms |
| Degassing Agent (Benzoin) | 2.8 gms |
| Black Pigment (Carbon Black) | 5.2 gms. |
| Total | 674.6 gms |

III. UV Curable Powder Coatings Applied to Wood: Coating Methods

In the application of uv powder coatings, as described above, to wood or wood-related products, perhaps the first problem encountered is the variation in properties from type of wood material to material and even within the same family or class of wooden products which may have been previously subject to different condition of heat, humidity, etc. For simplicity of terminology, we will use the term "wood" or "wooden" herein to denote wood extracted from trees as well as processed products related to wood, including but not limited to particle board, fiber board, medium-density-fiber-board, "MDF" and numerous other products manufactured from various kinds of wood or analogous products from plants, produced by means of numerous manufacturing processes, many proprietary to specific manufacturers and commonly known by tradenames.

A significant problem in the successful formulation and application of powder coatings to wooden substrates is the requirement that the substrates be held below a certain temperature for all processing steps, typically about 93 deg. C. (200 deg. F.) to avoid degradation in the properties or appearance of the wood. A review of the above powder coatings will reveal that, although applied to metallic substrates for ease of testing, the substrate temperature was not raised above 93 deg. C. in pre-heating, reflow or at any other time during the processing. Therefore, uv curable powder coatings as formulated above are embodiments of powder coatings acceptable for coating on wood.

One important mechanism for the degradation of wood substrates by excessive heat is the outgassing from the substrate of water and other reasonably volatile materials. This outgassing leads to pits, voids and various imperfections in the surface of the coated product, and an unsatisfactory coating. It is obviously beyond the scope of the experimental program related to the present invention of uv curable powder coatings to test all types of wood which may be used in various products of commerce. Therefore, in an attempt to select materials giving a serious challenge to the present coating methods and formulations, we selected for testing in conjunction with the present invention, a few wooden materials which are considered especially challenging by reason of outgassing in the production of adequate coatings. Such materials used herein are typically oak, beech, fiber board, and MDF. Red oak is typically used for testing of the present invention. However, the inventors believe that methods and formulations disclosed and claimed herein will generally be applicable to a broad class of wooden substrates, subject to verification or simple modifications to fit the particular substrate by procedures well known to those skilled in the art. Therefore, test results, procedures, and specific examples described herein are intended to be approximately worst-case examples, and not meant to limit or otherwise restrict the applicability of the present inventions in use on similar, analogous or related substrates.

The successful application and curing of powder coatings on wooden substrates involves both the appropriate formulation of coating materials and use of the appropriate coating procedures. The present invention, therefore, involves both formulations of coatings as described in detail above and methods for application and curing. It is not entirely possible to describe one without reference to the restrictions imposed by the other. For example, it is not entirely possible to discuss the coating process without reference to the typical powder coatings and formulations to be employed. Typically, a change in the formulation may be helpful in overcoming an unsatisfactory performance from a processing step. However, we will attempt to describe the preferred embodiments for processing and for formulations in a distinct manner, making cross reference to the other when and as needed.

One basic problem to be addressed by the present invention is the coating of powders onto wooden substrates without the use of volatile solvents, etc. Essentially, the present invention is intended to provide an analogue to electrostatic coating procedures typically used for conductive substrates, with appropriate modifications to render the procedure useful for wood. Therefore, the first problem encountered is that of electrostatic deposition of powders onto wood.

A major advantage in the use of electrostatic deposition onto metals is the ease with which powder coatings fully coat all regions of parts with complex shapes, even difficult to access regions. Electrostatic attraction apparently tends to cause powder coating particles to migrate to uncoated portions of the substrate in which the electrostatic attraction is unshielded by a coating of material which is typically an electrical insulator. This effect would also provide a useful advantage in the application of powder coatings electrostatically to wooden substrates as wood typically has surface texture or grain which must be fully coated in all aspects for a satisfactory coating.

The electrical properties of wood have been summarized in "Wood Application Handbook" by U. S. Forest Products Laboratory, (Prentice-Hall, 1974) pages 3-21 to 3-23 inclusive. It is apparent that the electrical properties of wood are highly dependent on moisture content, and on the type or wood under consideration. Typical electrical conductivities of wood can vary by 13 orders of magnitude as the moisture content of wood changes, and can vary by more than 2 orders of magnitude for different types of wood having the same moisture content. In addition, electrical conductivity varies with applied voltage and ambient temperature, increasing by approximately a factor of 2 for each rise in temperature of 10 deg. C. Thus, while not an excellent conductor, the electrical properties of wood are not those of an excellent electrical insulator, either. Therefore, testing of electrostatic deposition of powder coatings on wood is a reasonable procedure.

In the course of the present invention, both corona and tribocharging of the powder were tested along with grounded and ungrounded wooden substrates. It was found that the use of electrical ground connected to the wooden substrate was typically very effective in increasing the coverage by the powder. It is speculated that the electrical conductivity of the typical wooden substrate is sufficient to require electrical grounding for adequate coverage. As shown below, most of the present tests involved wooden substrates heated to the region of 165–195 deg F. This has typically proven to be a helpful, but not always necessary, step in raising the electrical conductivity of the wood (and also in softening the powder and, thus, enhancing the adherence of the powder to the substrate once contact is made). Thus, it is expected that the electrical conductivity of wood will be substantially larger than that of unheated wooden substrates, perhaps adding to the effectiveness of electrical grounding in enhancing powder coverage. However, detailed experimental evaluation has not been done to evaluate thoroughly the specific reasons for the advantageous effects of electrical grounding on wooden substrates, and the above remarks should be regarded as merely a tentative and speculative explanation. However, the experimental results obtained thus far clearly illustrate the advantages of electrical grounding. Thus, the presently preferred embodiment for the electrostatic deposition of powder coatings onto wooden substrates utilizes an electrically grounded substrate.

Both corona charging and tribocharging of the powder were tested for efficacy of coating onto wood, in both cases with electrically grounded wooden substrates. It was found that, typically, the tribocharged powder coated most effectively. It is known in the field that one of the advantages of tribocharging over corona charging is that tribocharging typically produces a more uniform charging of the powder. We may speculate that uniformity of charge on the powder becomes more important for substrates such as wood which are not highly conductive of electricity and may itself have locally nonuniform electrical properties. Yet another advantage well known to be present for tribocharging over corona charging is that, in typical operation, tribocharged powders are applied to the substrate by means of deposition through lengths of dielectric tubing, either by spiral motion down the tube or another technique. Such tubing imparts the electrostatic the charge to the powder and simultaneously causes the powder to exit from the tribocharging tube or mechanism in close proximity to the substrate to be coated. The release of the powders from the tribocharging mechanism in close proximity to the substrate is known to be more effective in coating highly structured substrates with difficult to reach regions. We may speculate that an analogous process is at work in the coating of wooden substrates in which different regions of the substrate in close proximity to one another may present very different electrical characteristics to the approaching powder, in rough analogy to highly complex shapes present on conventional substrates presenting very different environments to the approaching powder. However, such arguments have not been tested experimentally and should be taken as speculation at the present time, not essential to the practice of the present invention. It is to be learned from the present invention that, in most cases tested, the typical tribocharged application of powder coatings to wooden substrates leads to better results than those obtained with corona charging and subsequent spray application of powder under similar conditions and powder formulations.

Electrostatic deposition with grounding of the wooden substrate does not appear to solve all problems, or to achieve commercially acceptable coatings, for all instances. For this reason, it is necessary to have other processing steps. It has been found for the present invention that it is frequently helpful to heat the wooden substrate prior, and during, the electrostatic deposition of the powder coating. This preheating step is typically in the range of 165–190 deg F. depending on the powder formulation used. (As we discuss in more detail below, it is typically necessary to include as part of the powder coating formulation agents for the depression of the melting point so temperatures on the wooden substrate do not exceed 200 deg F.) This preheating causes the powder to soften and flow upon contact with the substrate, leading to better coverage.

One important conclusion of the present invention is that the electrical conductivity of the wooden substrate is a significant factor in achieving adequate powder coatings. Thus, processing steps tending to increase such electrical conductivity are favored. As noted above, heating the wood tends to increase the conductivity as well as aid in the sticking of the powder to the wood. However, increasing the moisture content of the wood also is well known to increase its electrical conductivity. Qualitative tests performed in the course of this invention tend to indicate that controlling the environmental humidity of the wood is often helpful in achieving good coating. Thus, one typical processing step could involve the storage of the wood in a high-humidity environment prior to, and during processing. While this humidity control is often advantageous, it is not necessary for all wooden substrates; many of which have adequate water content without adjusting environmental humidity.

Thus, one preferred coating procedure under the present invention is to deposit tribocharged powder coating onto an electrically grounded wooden substrate in which the substrate has been maintained at high moisture content by means of humidity control, and heated just prior to deposition to a temperature sufficient to soften the powder during deposition. Typically, such temperatures are in the range of 165–190 deg F. However, the moisture control and the pre-heating of the wooden substrate are both optional steps in the present invention. Either or both may prove to be unnecessary for particular coatings applied to particular substrates.

Control of moisture content and temperature are not the only ways to control the electrical conductivity of the substrate. It is also possible to apply a conductive coating to the substrate prior to applying the powder. Thus, a conductive paint or the like may typically be applied to the wooden substrate. This enhances the electrical conductivity of the surface region of said substrate, which is frequently satisfactory to achieve adequate subsequent coating with a (typically nonconducting) powder. Once again, this processing step is helpful in many instances but not necessary. The application of such a conductive coating complicates the powder coating process and would typically be omitted if adequate powder coating is otherwise achieved.

When adequately coated, the coating must be cured. Typically, curing by exposure to heat or ultraviolet (uv) radiation will be used. UV curing avoids the necessity for heating the wooden substrate to the curing temperature of the coating. Such thermal curing temperatures will typically be in excess of 200 deg F., which temperature is frequently taken as the upper limit of temperature typical wooden substrates can endure without degradation of properties or appearance. Therefore, thermal curing of powder coatings on wooden substrates is difficult unless very low temperatures cures are possible with the powder coating employed. UV cures with both cationic and free radical curing agents have been employed in the present experiments with comparable results.

Another serious problem with the application of coatings to wooden substrates along with the application of heat is the outgassing from the substrate of water or other volatile materials. Such outgassing commonly leads to pits, voids or gaps appearing in the coating, seriously damaging the usefulness of such coatings. For the present invention is has been found that a second "reflow" heating step is commonly helpful following the curing of the coating. Typically, the reflow heating will be to a temperature similar to the preheating step, that is 165–190 deg F. Such temperatures typically soften the coatings sufficient to heal and defects, pits or voids which may be introduced during cure. This re-flow heating is useful for many substrates but not always necessary. Certain substrates will not produce serious damage upon application of the coatings. For such substrates, re-flow heating will typically be omitted. The general approach is to reduce the complexity and the cost of processing by employing a minimum number of processing steps. Thus, if re-flow heating is not necessary (as may be the case), it will be omitted.

We show in FIG. 1 a schematic diagram of the process according to the present invention. A wooden substrate, 1, would typically be mounted on a cable, 2, for transport through the coating processing stations. In accordance with the present invention, the wooden substrate, 1, would be electrically grounded, 3.

As noted above, it may be helpful to pre-heat the wooden substrate to temperatures typically in the range 165–190 deg, F. If this step is to be used, the substrate, 1, would first pass through a pre-heating oven, 4. In practice, it is found that the wooden substrate, 1, typically maintains sufficient temperature through the powder coating station, 5. Thus, the typical process involving pre-heating would not necessarily maintain such heating through the powder coating station, 5, although this could certainly be done if the results justified the additional processing complications.

Following pre-heating (if any), the substrate, 1, is typically transported to the powder coating station, 5. Here the powder is applied, 6 by standard electrostatic deposition techniques, typically tribocharging deposition.

In addition, we discussed above the possible advantages to be realized from control of the humidity of the wooden substrate. We indicate by 7 on FIG. 1 a controlled humidity environment for enhancing the electrical conductivity of the wood. The humidity is shown in FIG. 1 as encompassing the pre-heating station, 4, as well as the coating station, 5. In practice, humidity control may not be necessary in one or both of these stations. It may be sufficient to store the wood in a controlled humidity environment for an appropriate time prior to processing, and process the substrate sufficiently rapidly in ambient humidity so no significant diminution of electrical conductivity occurs. Moreover, for some substrates humidity control may not be necessary at all and the processing steps symbolized by 7 on FIG. 1 may be entirely omitted.

Following application of the powder in station 6, it is often useful to re-flow the powder coating to enhance coverage. This would be accomplished typically by passing the substrate, 1, through a re-flow oven, station 8 on FIG. 1 Typically, re-flow heating (if necessary) would be in the range 165–190 deg. F., although this can be omitted entirely for certain substrates in which the powder coating, as applied, provides sufficient coverage, texture and appearance.

The final step in the powder coating process is the curing station, 9. This could be another curing oven, or exposure to radiation in the form of heat (infra-red lamps) or reaction-initiating radiation, typically in the uv spectral region.

IV. UV Curable Powder Coatings Applied to Wood: Examples

The following are a few typical examples of wood substrates (typically oak or beech) coated by means of powder formulations in the general manner, and following the procedures, described above. We report herein only certain specific formulations for the purposes of illustrating the general applicability of the powder coating formulation and methods described herein. Variations in procedure using humidity control, electroconductive coatings, and other variations as described above may be employed along with those specific formulations described below, or with straight forward modifications, for the purposes of testing other compounds. The formulations herein are meant to be illustrative only, and not to preclude other analogous, similar or related formulations, or variations in procedure, which are indicated by, or clearly related to, the descriptions elsewhere herein.

For the following examples, samples of wood were pre-heated to 190 deg F. for typically 10 to 30 minutes prior to coating, typically in a convection oven. The powder was then electrodeposited by means of corona discharge onto grounded wood substrates. The coating was re-flowed at a temperature of 190 deg F. for a period of 5 minutes, typically by means of a convection oven. The following coatings were cured using an "H" bulb as described above with total exposures from approximately 2.4 to 7.5 Joules/(sq. cm.). Pigmented additives were not employed. However, the inventors anticipate no significant differences on wood substrates from that reported above for metal substrates when powder coatings including pigmented additives are employed, in the method and manner essentially as described elsewhere herein.

| | |
|---|---:|
| Unsaturated Polyester (Hoechst VAN 1743) | 424.3 gms |
| Acrylourethane (Hoechst VXL 1385) | 181.9 gms |
| Photoinitiator (Irgacure 907) | 19.5 gms |
| Plasticizer (Benzoflex 352) | 70.0 gms |
| Degassing Agent (Benzoin) | 2.8 gms |
| Flow Agent (Troy EX 486) | 21.0 gms. |
| Wax (Petrac Slipquick) | 21.6 gms |
| Total | 741.1 gms |

In general, formulations with approximately 2.5% by weight photoinitiator seem to give acceptable performance.

Variations on the above procedures can also be used with satisfactory results in many cases. Pre-heating and re-flow heating can be performed by means of exposure to infra-red lamps. Using uv lamps as a heat source, as in the work of Holliday cited above, is possible in for pre-heating and re-flow in the practice of the present invention, but must be performed with care so as not to begin uv curing of the coating prematurely. In many cases, pre-heating can be eliminated without seriously degrading the results. However, the specific conditions for pre-heat and re-flow heating are apparently dependent upon the type of wood used for the substrate. As noted above, the properties of wooden substrates can vary markedly. But it is a matter of straight-forward experimentation to ascertain the conditions required for the particular sample to be coated.

We claim:

1. A method for coating a substrate comprising the steps of:
    a) depositing onto said substrate a powder coating comprising; i) a radiation curable resin mixture comprising a mixture of acrylourethane resin and an unsaturated polyester resin wherein the polyester resin is chosen from the group consisting of maleate containing resins and fumarate containing resins, and, ii) a photoinitiator chosen from the group consisting of morpholino containing photoinitiators, phenol containing photoinitiators, ketal containing photoinitiators, and phosphine containing photoinitiators, wherein said photoinitiator comprises from approximately 0.8% to approximately 7.5% of the total weight of said radiation curable resin mixture, and, iii) a plasticizer in sufficient quantity to cause the flow temperature of said powder to be less than approximately 200 degrees Fahrenheit;
    b) heating said coated substrate to a temperature of approximately 185 to 200 degrees Fahrenheit for sufficient time for said coating to coalesce into a substantially continuous coating on said substrate; and,
    c) exposing said coating to uv radiation for sufficient time to cure said coating.

2. A method for coating a substrate as in claim 1 wherein said coating is deposited onto said substrate by means of electrostatic deposition.

3. A method for coating a substrate as in claim 2 wherein said coating is from approximately 0.001 to approximately 0.002 inches in thickness.

4. A method for coating a substrate as in claim 1 wherein said uv radiation comprises radiation from a medium pressure mercury lamp.

5. A method for coating a substrate as in claim 3 wherein said exposure comprises exposing said substrate to uv radiation of from approximately 2.4 to 7.5 Joules per square centimeter.

6. A method for coating a substrate as in claim 1 wherein said powder coating further comprises a white colorant.

7. A method for coating a substrate as in claim 6 wherein said uv radiation comprises radiation from a doped mercury lamp.

8. A method for coating a substrate as in claim 7 wherein said exposure comprises exposing said substrate to uv radiation of from approximately 4.8 to 5.1 Joules per square centimeter.

9. A method for coating a substrate as in claim 1 wherein said powder coating further comprises a black colorant.

10. A method for coating a substrate as in claim 9 wherein said uv exposure comprises radiation from a medium pressure mercury lamp.

11. A method for coating a substrate as in claim 1 wherein said unsaturated polyester resin comprises from approximately 30% to approximately 70% of the total weight of said resin mixture.

12. A method for coating a substrate as in claim 1 wherein said unsaturated polyester resin comprises approximately 70% of the total weight of said resin mixture.

13. A method for coating a substrate as in claim 1 wherein said photoinitiator comprises from approximately 2.2% to approximately 2.7% of the total weight of said resin mixture.

14. A method for applying a powder coating to a wooden substrate comprising the steps of:

a) electrically grounding said wooden substrate;

b) electrostatically charging a powder coating comprising; i) a radiation curable resin mixture comprising a mixture of acrylourethane resin and an unsaturated polyester resin wherein the polyester resin is chosen from the group consisting of maleate containing resins and fumarate containing resins, and, ii) a photoinitiator chosen from the group consisting of morpholino containing photoinitiators, phenol containing photoinitiators, ketal containing photoinitiators, and phosphine containing photoinitiators, wherein said photoinitiator comprises from approximately 0.8% to approximately 7.5% of the total weight of said radiation curable resin mixture, and, iii) a plasticizer in sufficient quantity to cause the flow temperature of said powder to be less than approximately 200 degrees Fahrenheit;

c) directing said electrostatically charged powder onto said substrate until substantially all of said substrate requiring coating is coated with said powder; and, d) curing said powder coating, forming thereby a continuous coating on said substrate.

15. A method as in claim 14 further comprising, immediately preceding step (a) thereof, the step;

a") heating said substrate to a temperature not exceeding 200 degrees Fahrenheit.

16. A method as in claim 14 further comprising, immediately following step (c) and preceding step (d) thereof, the step:

c') heating said substrate and said powder thereon to a temperature causing flow of said powder coating sufficient to remove from said coating substantial surface roughness and voids in said coating, said temperature not exceeding 200 degrees Fahrenheit.

17. A method as in claim 14 wherein, immediately prior to said directing step, said wooden substrate is maintained in a controlled environment of higher than ambient relative humidity, for a time sufficient to increase the moisture content in said wooden substrate.

18. A method as in claim 14 further comprising, preceding step (c) thereof, the step:

b" ) coating said wooden substrate with an electrically conductive coating.

19. A method as in claim 15 wherein said heating of said substrate is to a temperature of approximately 165 to 190 degrees F.

20. A method as in claim 16, wherein said heating of said substrate is to a temperature of approximately 165 to 190 degrees F.

21. A method for applying a powder coating to a wooden substrate as in claim 14 wherein said unsaturated polyester resin comprises from approximately 30% to approximately 70% of the total weight of said resin mixture.

22. A method for applying a powder coating to a wooden substrate as in claim 14 wherein said unsaturated polyester resin comprises approximately 70% of the total weight of said resin mixture.

23. A method for applying a powder coating to a wooden substrate as in claim 14 wherein said photoinitiator comprises from approximately 2.2% to approximately 2.7% of the total weight of said resin mixture.

* * * * *